United States Patent [19]
Nadel et al.

[11] Patent Number: 5,835,059
[45] Date of Patent: Nov. 10, 1998

[54] DATA LINK AND METHOD

[75] Inventors: Jesse H. Nadel, Downington; Glenn R. Snape, King of Prussia; Peter F. Stevens, Paoli, all of Pa.

[73] Assignee: Lockheed Martin Corporation, Bethesda, Md.

[21] Appl. No.: 522,642

[22] Filed: Sep. 1, 1995

[51] Int. Cl.$^6$ ...................................................... G01S 1/44
[52] U.S. Cl. .......................... 342/398; 342/456; 342/37
[58] Field of Search .................................. 342/398, 456, 342/37; 364/439

[56] References Cited

U.S. PATENT DOCUMENTS

| | | |
|---|---|---|
| 2,971,190 | 2/1961 | Busignies . |
| 3,801,980 | 4/1974 | Danton et al. . |
| 3,849,782 | 11/1974 | Bond . |
| 3,875,570 | 4/1975 | Litchford . |
| 3,895,385 | 7/1975 | Alpers . |
| 4,003,050 | 1/1977 | Miller . |
| 4,107,674 | 8/1978 | Funatsu et al. . |
| 4,293,857 | 10/1981 | Baldwin . |
| 4,417,248 | 11/1983 | Mathews . |
| 4,438,439 | 3/1984 | Shreve ..................................... 342/449 |
| 4,688,046 | 8/1987 | Schwab ................................... 342/456 |
| 4,719,465 | 1/1988 | Kuroda ..................................... 342/151 |
| 4,789,865 | 12/1988 | Litchford . |
| 4,816,833 | 3/1989 | Ferguson et al. . |
| 4,823,272 | 4/1989 | Inselberg . |
| 4,843,397 | 6/1989 | Galati et al. ............................... 342/59 |
| 4,853,700 | 8/1989 | Funatsu et al. . |
| 4,910,526 | 3/1990 | Downington et al. .................. 342/455 |
| 4,970,518 | 11/1990 | Cole, Jr. . |
| 4,978,945 | 12/1990 | Funatsu ................................... 340/961 |
| 5,075,594 | 12/1991 | Donnangelo et al. .................. 342/455 |
| 5,077,673 | 12/1991 | Brodegard et al. ..................... 364/461 |
| 5,081,463 | 1/1992 | Hariu et al. .............................. 342/372 |
| 5,089,822 | 2/1992 | Abaunza et al. ......................... 342/30 |
| 5,107,268 | 4/1992 | Sturm et al. . |
| 5,196,855 | 3/1993 | Kuroda ..................................... 342/37 |
| 5,208,591 | 5/1993 | Ybarra et al. . |
| 5,218,365 | 6/1993 | Woodall . |
| 5,235,336 | 8/1993 | Sturm et al. . |
| 5,280,285 | 1/1994 | Curtis et al. ............................. 342/398 |
| 5,381,140 | 1/1995 | Kuroda et al. . |
| 5,450,329 | 9/1995 | Tanner . |
| 5,463,398 | 10/1995 | Young . |
| 5,528,244 | 6/1996 | Schwab . |
| 5,552,788 | 9/1996 | Ryan et al. . |
| 5,566,074 | 10/1996 | Hammer . |
| 5,625,885 | 4/1997 | Nakazawa et al. .................... 455/54.1 |

OTHER PUBLICATIONS

G. R. Snape and P. F. Stevens, "A Demonstration of Mode S Low Latency Data Link, Surface Target Tracking and Controller–to–Aircraft Data Transmission" in *40th Annual Air Traffic Control Association Conference Proceedings: Fall 1995* (Air Traffic Control Association, Inc., Arlington, VA, 1995) pp. 252–256.

G. Snape and J. Nadel, "Mode S Data Link Capacity Enhancement Using a Nonrotating Antenna" in *38th Annual Air Traffic Control Association Convention Proceedings: Fall 1993* (Air Traffic Control Association, Inc., Arlington, VA, 1993) pp. 334–338.

V. A. Orlando and P. R. Douilhet, *Mode S Beacon System; Functional Description* (Report No. DOT/FAA/PM–83/8) available from the National Technical Information Service.

V. B. Orlando and P. R. Drouilhet, *Mode S Beacon System: Functional Desciption* (Report No. DOT/FAA/PM–86/19), available from the National Technical Information Service.

"Struggling Unisys digs in" in *The Philadelphia Inquirer*, Sep. 30, 1994, pp. C1 and C8.

*Primary Examiner*—Theodore M. Blum
*Attorney, Agent, or Firm*—Stanton D. Weinstein

[57] ABSTRACT

This is a Mode S radio frequency transmission system with coordinated use of a rotating directional antenna and omni-directional antennas. A software-implemented prefilter both processes messages destined for aircraft equipped with Mode S datalink capable transponders, and prevents any uplink message transmission to a transponder from coinciding with the once-per-scan surveillance interrogation from the rotating antenna as well as any datalink interrogations specified for transmission through the rotating antenna.

24 Claims, 12 Drawing Sheets

DATA LINK AND METHOD

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to communications, directive radio wave systems and devices (e.g., radar, radio navigation), and more particularly to selective electrical communications. The present invention also relates to air traffic control, and more particularly to secondary surveillance radar (SSR) or air traffic control radar beacon system (ATCRBS) or to a navigational radar transponder system. The present invention further relates to a secondary surveillance radar system which has operating functions of the Mode S, and performs surveillance of aircraft and aircraft-to-ground data link communications.

BACKGROUND OF THE INVENTION

The Mode Select Beacon System (Mode S) is a secondary surveillance radar system. It uses monopulse technology that provides higher accuracy than current Air Traffic Control Radar Beacon Systems (ATCRBS). Mode S also provides discrete addressing and a bidirectional digital data link. Mode S and ATCRBS are described in U.S. Pat. No. 5,089,822 issued Feb. 18, 1992 for "Interrogation Signal Processor for Air Traffic Control Communications" by John T. Abaunza et al, which patent is hereby incorporated by reference herein. Mode S and ATCRBS are also described in G. Snape and J. Nadel, "Mode S Data Link Capacity Enhancement Using a Nonrotating Antenna" in 38th Annual Air Traffic Control Association Convention Proceedings: Fall 1993 (Air Traffic Control Association, Inc., Arlington, Va., 1993) pp. 334–338, which is also hereby incorporated by reference herein. Also see V. A. Orlando and P. R. Drouilhet, Mode S Beacon System: Functional Description (Report No. DOT/FAA/PM-83/8) available from the National Technical Information Service.

In recent years, media attention has been given to the unsafe conditions at civil airports during conditions of low visibility and high traffic volume. These unsafe conditions are worsened when new cockpit crews are required to traverse unfamiliar airport movement areas. The problems resulting from runway incursions that recently occurred at a Detroit airport and at a Los Angeles airport point to an ever increasing workload for controller staffs, a workload for which they receive no support from computer automation. There is a need to automate the tower cab. One particular concern that such automation would be intended to address is the reduction of runway incursions. Such automation for the control tower cab would be needed to increase the safety of taxiing aircraft, reducing arrival/departure delays, and expediting surface movement without increasing controller workload. A runway incursion has been defined as any occurrence at an airport involving an aircraft, vehicle, person or object on the ground that creates a collision hazard or results in loss of separation with an aircraft taking off, intending to take off, landing, or intending to land. The primary causal factors of such runway incursions confronting controllers, pilots and ground personnel are very similar. They are based on human limitations, including communications (readback/hearback), poor visibility, scanning weaknesses, uncertainty about their own or others' positions, and simple forgetfulness of detail in complex and busy situations. The Federal Aviation Administration (FAA) operates some 400 to 500 air traffic control (ATC) towers in the United States. The FAA plans to provide automation at some or all of these towers. Safe and efficient transport to and from the runways is as critical a part of modern air travel as is the airborne portions. Automation in the tower cab should provide needed assistance in monitoring and warning controllers of unwanted runway occupation at very critical times. There is therefore a need for a data link for collection of surface vehicle position reports, without interfering with other RF activity. The present invention fulfills this need.

A Mode S sensor is a beacon radar surveillance system originally developed under contract for the Federal Aviation Administration by Westinghouse Corporation and by what is now Loral Defense Systems-Eagan. A beacon radar sends one signal to ATCRBS transponder-equipped aircraft to inquire for the aircraft's identification. The beacon radar sends a second signal to the aircraft to inquire for its altitude. The aircraft transponder automatically responds with an appropriate "reply" signal (transponder identification or aircraft altitude) in response to the interrogation by the beacon radar. Mode S transponders are discretely addressable using their 24 bit digital identification code. They respond to the altitude and identification interrogations from the beacon radar with a reply that contains their discrete identification code. Once the discrete id has been determined for a Mode S transponder-equipped target, the beacon radar interrogates the target with discrete interrogations, to which only the corresponding target responds. The radar signal from the beacon radar is transmitted over a restricted, narrow angle called the beam which for the Mode S sensor is typically 3.6 degrees of arc wide. Similarly, replies are only received from targets which are within the beam, although the replies transmitted by the transponder are omnidirectional. The Mode S transponder also automatically generates (squits), without receiving any interrogations, replies containing its Mode S identification code. The Mode S transponder, with enhancements, may also squit replies containing Global Positioning System (GPS) position data, or other data (such as flight identification) for that aircraft. This system provides two principal capabilities. It collects "surveillance" information and altitude from ATCRBS, Mode S and military transponder-equipped aircraft once per scan, where a scan is one rotation of the beacon radar antenna through 360 degrees of arc. Surveillance information can include aircraft location, usually in terms of distance from the sensor and azimuth or angle from magnetic north. Also, the capability is provided to transmit and receive data from Mode S transponder-equipped aircraft; i.e., a data link capability is provided.

Following an extensive development and formal test program, Mode S sensors are now being deployed with full Mode S capability at 148 sites through the United States. In addition to its improved accuracy and reduced interference characteristics, Mode S is intended to provide the capability for two-way data link between the ground and airport equipment. Proposed enhancements to this capability include TCAS Resolution Advisories for air traffic control facilities, and Traffic Information Service (TIS) and Graphic Weather Service (GWS) functions for pilots. TCAS collision avoidance informs a pilot of an imminent collision (if any) and what maneuver is necessary to avoid that collision. TIS is a feature that uses the Mode S data link and a display in the aircraft to alert the pilot about close aircraft. In addition, enhanced GPS Squitter, in conjunction with Differential GPS, could both provide an implementation of Automatic Dependent Surveillance (ADS) and provide surface surveillance of an airport. All of these enhancements, as well as the ground surveillance function described above, would benefit from, and some require, reduction in the latency inherent in the rotating antenna implementation of Mode S. The present invention fulfills this need.

SUMMARY OF THE INVENTION

Accordingly, an object of the present invention is to provide a data link having reduced latency and increased capacity.

Another object of the present invention is to provide apparatus and method for increasing data link performance (capacity and latency) without degrading surveillance.

A further object of the present invention is to coordinate the operation of one or more rotating antennas with operation of one or more omnidirectional antennas to reduce or prevent interference between the one or more rotating antennas and the one or more omnidirectional antennas.

Still another object of the present invention is to provide an enhanced data link system, for surface and close in targets, utilizing one or more nonrotating antennas and which will avoid interference with one or more rotating antennas.

A still further object of the present invention is to provide a rapid, robust, cost effective data link that is inexpensive and readily available.

Yet another object of the present invention is to provide apparatus and method for output signal coordination between a rotating directional antenna and an omnidirectional antenna.

Briefly, these and other objects of the present invention are accomplished by a radio frequency transmission system with coordinated use of at least one rotating directional antenna and one or more omnidirectional antennas. This system and method prevents any uplink message transmission from coinciding with the once-per-scan surveillance interrogation from the rotating antenna or antennas. A register is provided that shows the current azimuth or heading of a rotating antenna. To coordinate antenna operation, that register value is read and then compared with the azimuth of an intended target. If the target azimuth is found to be within the register azimuth plus or minus some value which is preferably some proportion of the beam width (e.g. a half or a full beam width), then the omnidirectional antenna or antennas having that target do not then transmit. This period of non-transmission would continue while the heading or beam of the rotating antenna is sufficiently directed towards that target. With a known speed of rotation for the rotating antenna, and with a fixed forbidden beam width size, such non-transmission preferably continues for a fixed time, after which the rotating antenna would no longer be transmitting to that target. Any uplink message transmission to a target is thereby prevented from coinciding with, and thereby interfering or being interfered with by, the once-per-scan surveillance interrogation from the rotating antenna.

Other objects, advantages and novel features of the invention will become apparent from the following detailed description of the invention when considered in conjunction with the accompanying drawings.

DESCRIPTION OF THE PREFERRED EMBODIMENT

Figure 1:
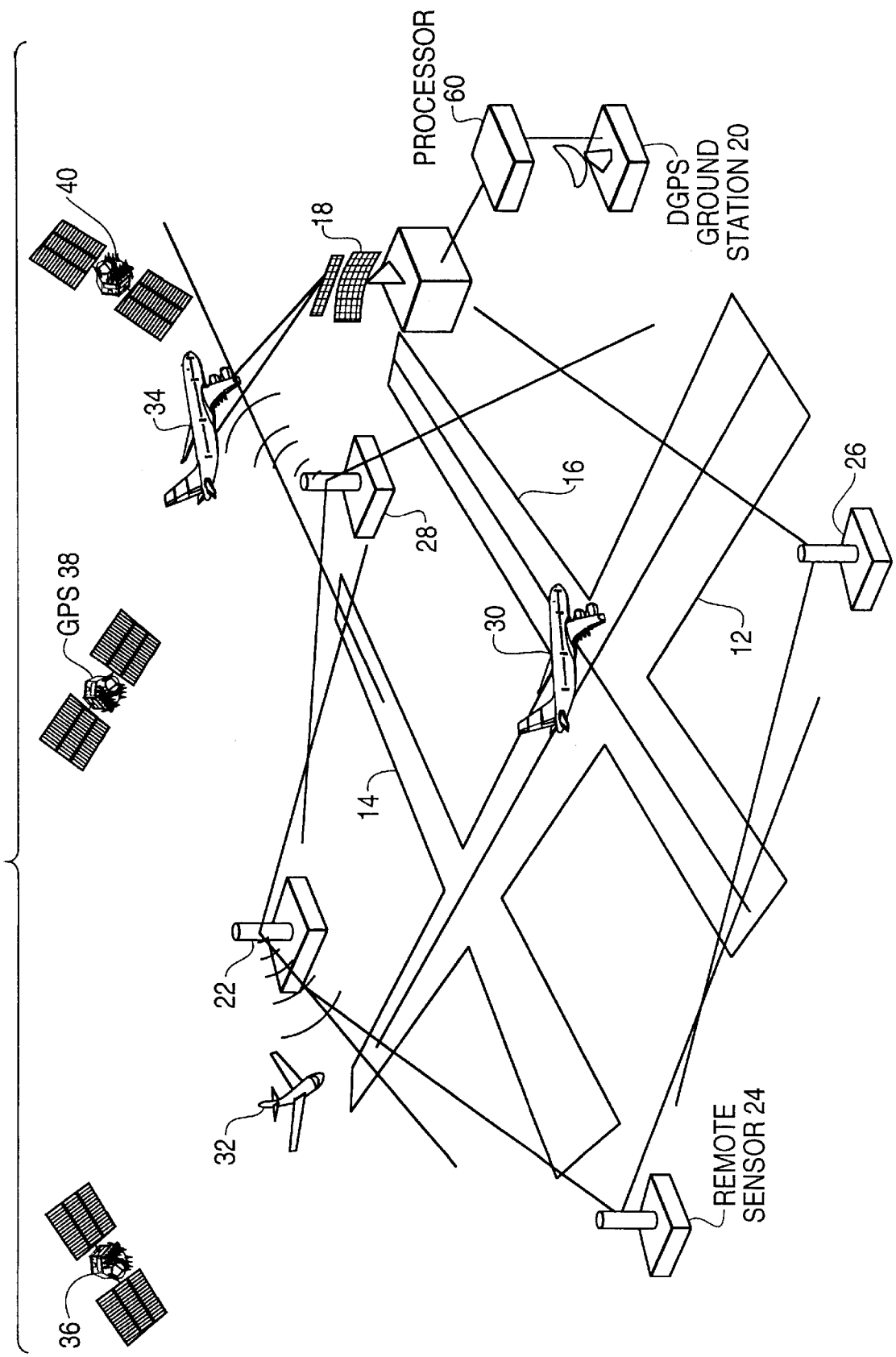
FIG. 1 shows an airport utilizing the present invention.

Referring now to the drawings, wherein like reference characters designate like or corresponding parts throughout the several views, there is shown in FIG. 1 an airport 10 provided with runways 12 and 14 and a taxiway 16. Airport 10 is provided with a Mode S rotating antenna 18, a Differential GPS (DGPS) ground station 20 and remote sensors 22, 24, 26 and 28. Each remote sensor 22, 24, 26 and 28 includes a respective nonrotating (e.g. omnidirectional) antenna 42, 44, 46 or 48, and a respective receiver/transmitter 62, 64, 66 or 68. Also shown are an aircraft 30 on the ground, a second aircraft 32 approaching runway 12 to land, and a third aircraft 34 flying over airport 10. Global Positioning System (GPS) satellites 36, 38 and 40 are each placed in earth orbit for providing GPS location information to ground station 20 and to aircraft 30, 32 and 34. Nonrotating receiver/transmitter units 42, 44, 46 and 48 are positioned at locations on the airfield which provide sufficient coverage of the desired areas. These units are connected to a workstation or other processor 60 that combines the reports from those units, and communicates to the main processor 53. Coverage need not be limited to the surface, but can include the entire terminal area for approaching and departing aircraft. The particular number of nonrotating antennas used depends on the particular installation. FIG. 1 shows how such an architecture covers the terminal area. Nonrotating antennas 42, 44, 46 and 48 provide limited vertical aperture coverage of the surface. The positioning is chosen to provide each such antenna with a view of the movement area, adequate for multilateration. Since at least 3 such antennas will have a view of any target, this provides redundancy for surface coverage for data link functions. Workstation 60 provides multilateration processing. The transmit and receive functions are managed and coordinated by the Mode S DPS. A DGPS ground station 20 is included to provide correction data to the DPS 53. Differential GPS (DGPS) is a version of GPS that supplies positional data with an accuracy of on the order of 5 meters, RMS versus 30 meters customarily available from GPS. The needed DGPS correction factors are generated by a surveyed ground station with a GPS receiver that can receive the same GPS satellites in view of the user's GPS receiver. The antenna characteristics of each of the remote nonrotating antennas 42, 44, 46 and 48 are chosen based on the specific needs of an airport; they can be for example omnidirectional or sectorized. Omnidirectional antennas 42, 44, 46 and 48 are used to determine location of aircraft 30, 32, 34, etc. at or in the vicinity of airport 10.

Figure 2:
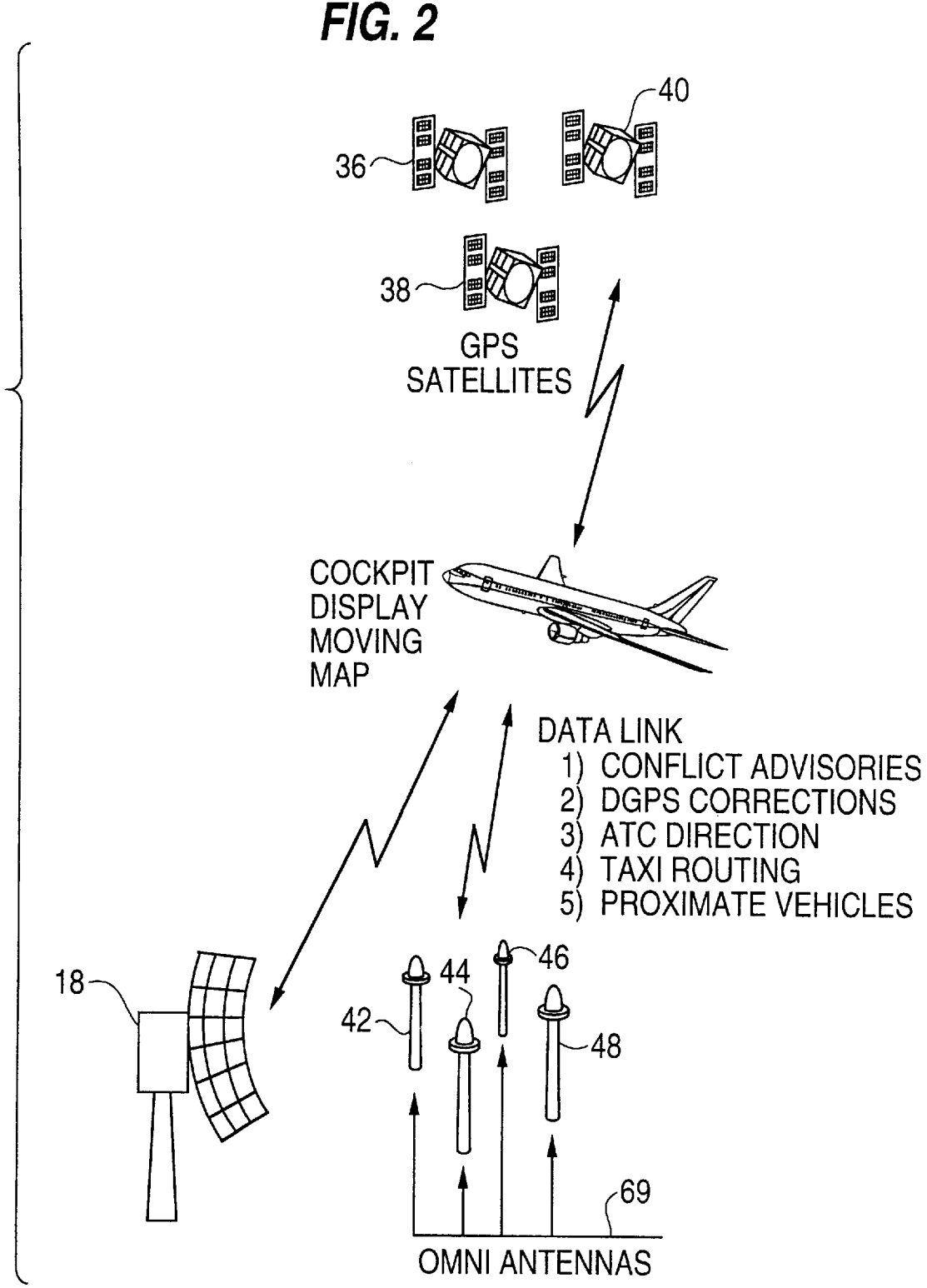
FIG. 2 is a more detailed view showing an aircraft, and a rotating antenna and omnidirectional antennas utilized according to one embodiment of the present invention.

As is shown in FIG. 2, airport 10 is provided with omnidirectional antennas 42, 44, 46 and 48 as part of remote sensors 22, 24, 26 and 28 respectively. Obviously, the number of aircraft, omnidirectional (or other nonrotating) antennas, remote sensors, GPS satellites and transponders is not limited to the particular number illustrated in any of FIGS. 1–5; any reasonable number can be used. Rotating antenna 18 is used to identify the instantaneous radar position of overflying aircraft 34 (or any other aircraft) and to provide that information to the air traffic controllers. Rotating antenna 18 can also be used to send information to, or to receive information from, aircraft 34 (or any other aircraft) as described above. Omnidirectional antennas 42, 44, 46 and 48 provide a data link with aircraft 34 such as to provide aircraft 34 with conflict advisories, DGPS corrections, ATC direction, taxi routing, and existence and location of any proximate vehicles. However, in order for omnidirectional antennas 42, 44, 46 and 48 to provide such a link, it is necessary that rotating antenna 18 not interfere with such provision, and preferably vice versa.

Figure 3:
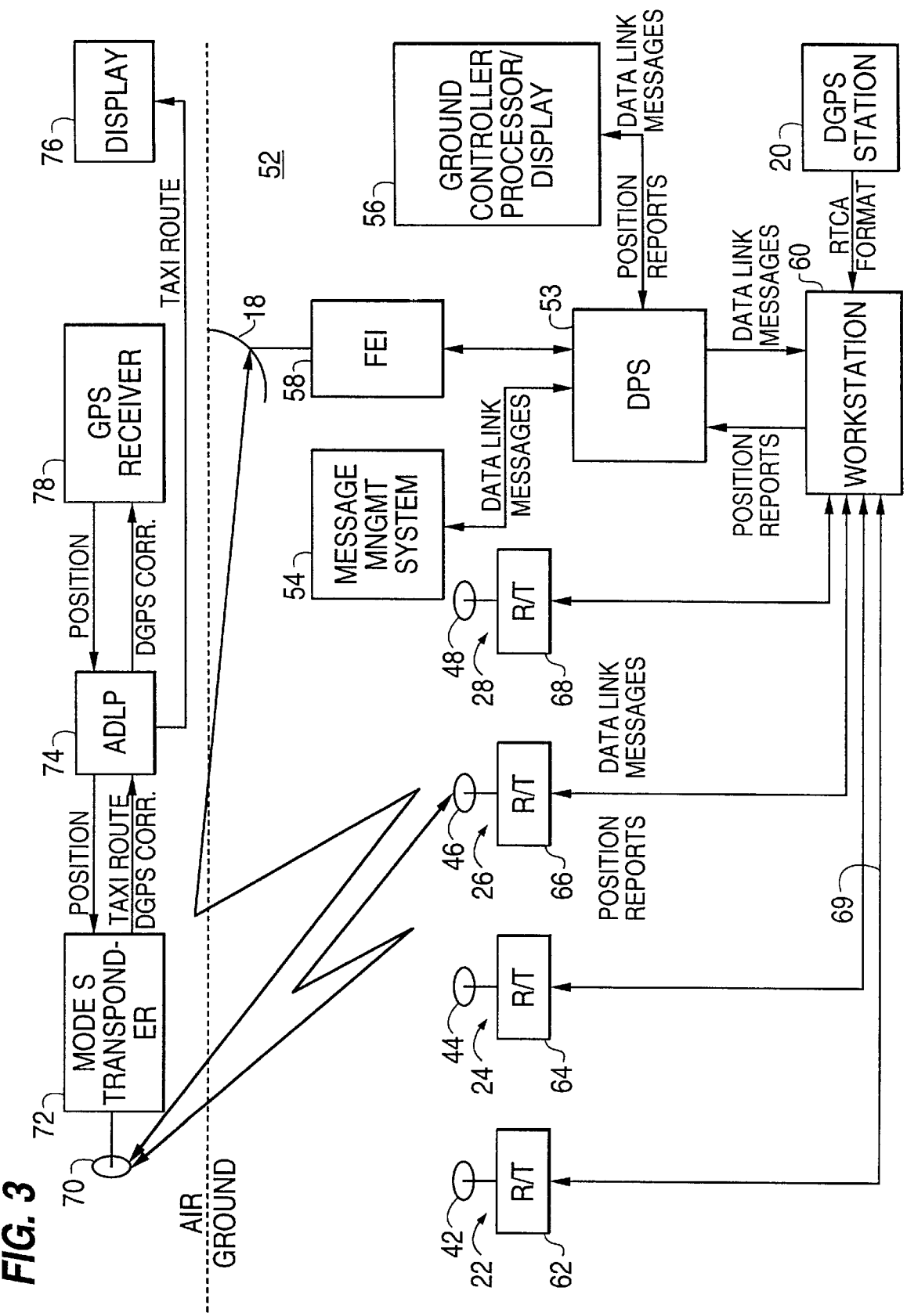
FIG. 3 is a block diagram of a system in which coordination apparatus and method of the present invention can be utilized.

Omnidirectional or non-rotating antennas 42, 44, 46 and 48 are used in conjunction with rotating antenna 18 to provide reduced data link latency. In addition, GPS squitter from aircraft 30, 32 and 34 provide positional data to support surface and close-in airborne tracking, and map displays both on the ground and in the cockpit showing aircraft position and movement relative to runways and taxi ways. A block diagram of a system 52 for this purpose is shown in FIG. 3. Data processing system 53 provides communications with ground-based equipment, including message management system (MMS) 54 and ground controller processor/display 56. MMS 54 can for example be an air traffic control display with a data link, providing controller messages/directions to/from aircraft. Air-ground communications is effected via two paths, one through front end interrogator (FEI) interface 58 via rotating antenna 18 to airborne Mode S transponders, and the other through workstation 60 to receiver/transmitters 62, 64, 66 and 68. Workstation or other processor 60 provides Mode S interrogation and reply functions, and additionally can provide position reports of targets using multilateration or multilateral triangulation. Each receiver/transmitter 62, 64, 66 and 68 has a corresponding omnidirectional antenna 42, 44, 46 and 48 connected thereto. Air-ground communications can be effected through workstation 60 to receiver/transmitters' 62, 64, 66, 68 respective omnidirectional antennas 42, 44, 46 and 48 to either airborne or on-the-surface Mode S transponders such as transponder 72 in aircraft 34. This latter path allows a reduction in message latency compared to the rotating antenna path. Each message is transmitted from either the rotating antenna 18 or an omnidirectional antenna 42, 44, 46 or 48, and are received by the antenna 70 of the airborne or on-the-surface Mode S transponder such as transponder 72. On board the aircraft such as aircraft 34, messages are transferred between the Mode S transponder such as transponder 72 and the airborne datalink processor (ADLP) 74, and from there to a pilot display 76 or a GPS receiver 78. The enhanced GPS squitter capability is a combined function of GPS receiver 78 and ADLP 74. ADLP 74 receives differential GPS corrections from the DGPS ground station 20 via workstation 60, receiver/transmitters 62, 64, 66, 68, omnidirectional antennas 42, 44, 46, 48, transponder antenna 70 and transponder 72. The differential corrections are transmitted in Mode S linked broadcast COMM A messages. The differential corrections are transferred to GPS receiver 78, which supplies a once-per-second position measurement to ADLP 74. ADLP 74, in turn, incorporates this information into an enhanced Mode S squitter message, which is transmitted as an unsolicited reply (squitter) by the Mode S transponder 72 twice a second. These squitters are detected by receiver/transmitters 62, 64, 66, and 68 via their respective omnidirectional antennas 42, 44, 46 and 48, decoded and forwarded to workstation 60. Workstation 60 serves as the communications facility attached to the Mode S omnidirectional sensors 22, 24, 26 and 28 via lines 69. At workstation 60, the inputs from the receiver/transmitters 62, 64, 66 and 68 are combined, and a position report carrying the DGPS position information is sent to system 53, which in turn provides the data to processor/display 56.

Figure 5:
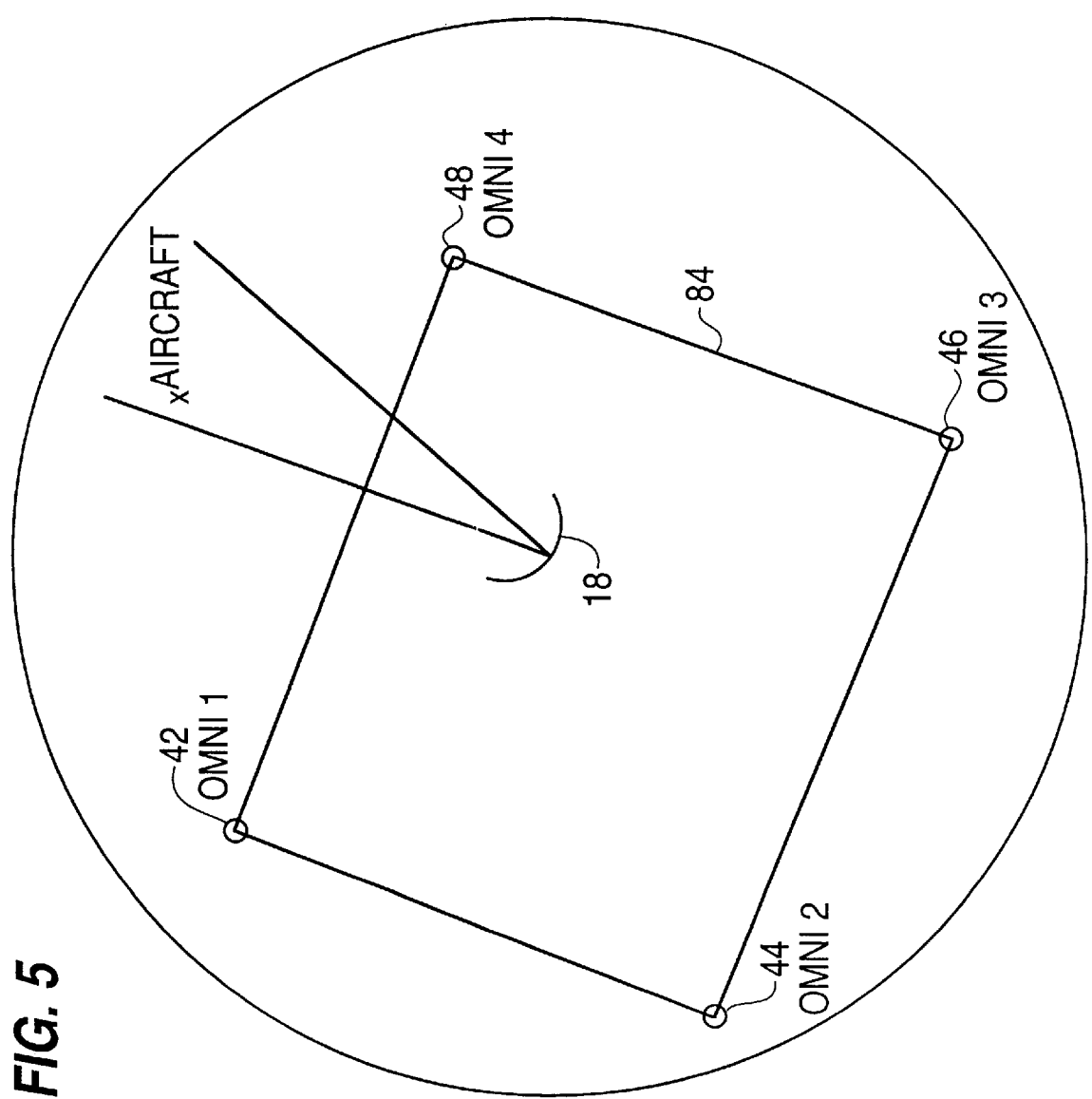
FIG. 5 illustrates in a simplified top view, a rotating antenna, its beam, and location of omnidirectional antennas within the scan range of the rotating antenna.

Remote sensors 22, 24, 26 and 28 are connected to workstation 60 via high speed data communications lines 69. Workstation 60 is connected to data processing system 53 via high speed data communications lines. Each remote sensor 22, 24, 26 and 28 can report the position of any Mode S transponder 72 equipped aircraft 34 that can be received by at least three of the omnidirectional antennas 42, 44, 46 and 48 by means of geometric triangulation. The resulting triangulation position is accurate when the aircraft being triangulated is located within, or within a few miles of, the perimeter of the closed plane 84 defined by the set of antennas that will receive the signal, as can be more clearly seen in FIG. 5. All Mode S transponders transmit an unsolicited reply or squitter signal to identify itself, at least once each second. If an aircraft being tracked is too far outside the perimeter of the closed plane 84 defined by omnidirectional antennas 42, 44, 46 and 48, then the azimuth of that aircraft can be accurately determined, but not its range. If that aircraft is equipped with a specially modified transmitter and GPS positioning instrument, then the omnidirectional transmission subsystem will report the aircraft's position as long as one of the omnidirectional antennas 42, 44, 46 or 48 can decode the transponder's unsolicited reply or squitter. As shown in FIG. 5, scheduling of data transmission to an aircraft via any omnidirectional antenna 42, 44, 46 or 48 is inhibited while that aircraft is in the rotating antenna 18 beam 80, so that the present invention coordinates the transmission of data to the aircraft.

Figure 4:
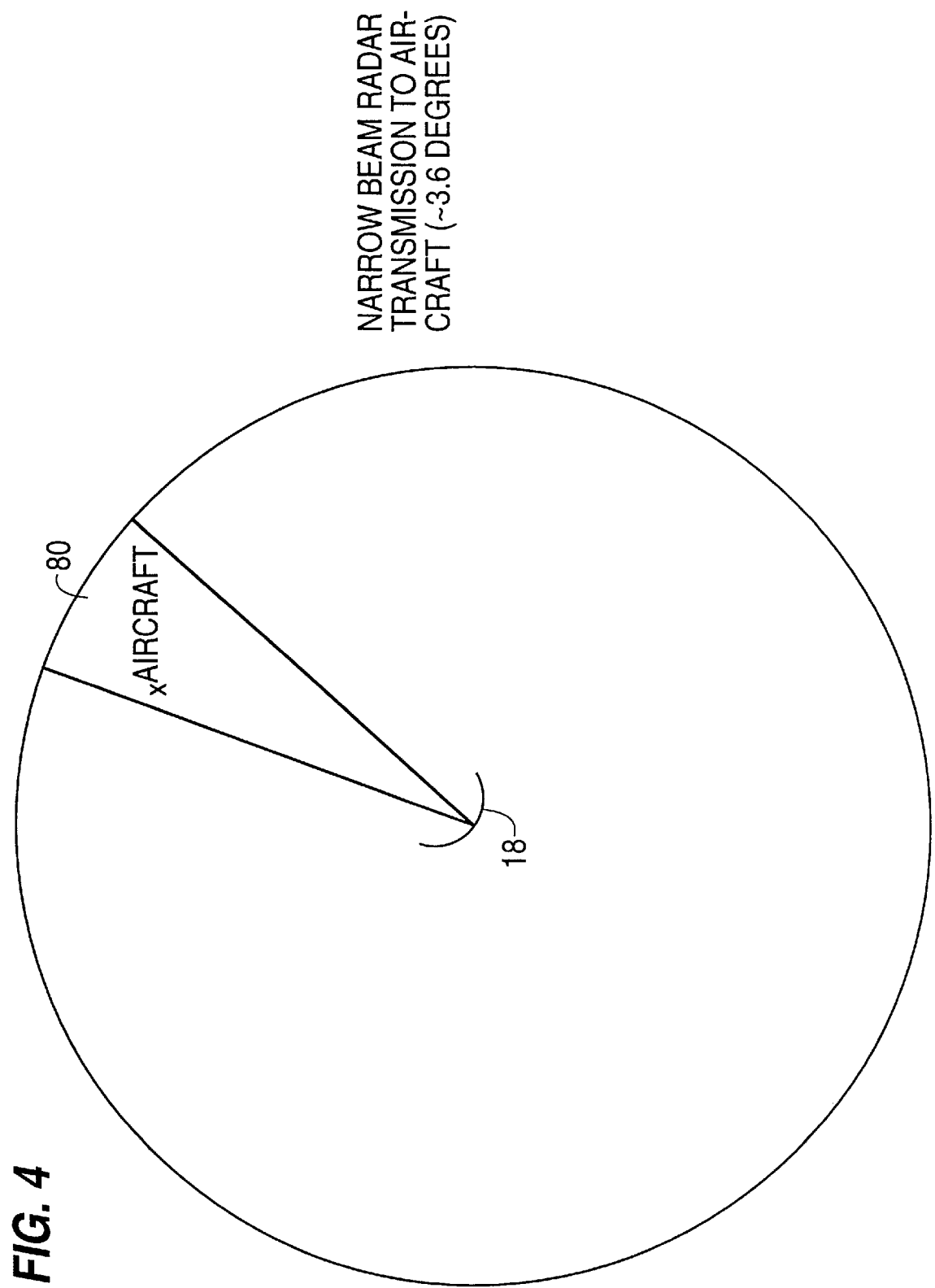
FIG. 4 illustrates with exaggeration one example of the beam of the rotating directional antenna of FIGS. 1, 2 and 3.

As discussed above, rotating antenna 18 is used to determine radar position of aircraft in the area. Rotating antenna 18 can also send both one signal to a transponder 72 equipped aircraft 34 to inquire for the aircraft's identification and a second signal to inquire for the aircraft's altitude. The aircraft 34 transponder 72 automatically responds to these inquiries with an appropriate reply signal providing the requested information in response to this interrogation by the beacon radar via rotating antenna 18. The radar signal from rotating antenna 18 is transmitted and received over a restricted, narrow angle called the beam 80, as shown in FIG. 4. The beam can for example be 3.6 degrees of arc wide. The beam 80 is produced by a directional antenna 18 rotating at a constant speed. The rotating antenna's radio frequency transmission and reception hardware, front end interrogator (FEI) 58, is shown with antenna 18 in block diagram form in FIG. 3. FIG. 3 shows a communications message source 54 providing its signal to data processing system 53. Data processing system 53 conveys the signal from source 54 to FEI 58. FEI 58 in turn provides the signal from source 54 to rotating antenna 18 for RF transmission to antenna 70 of transponder 72 in aircraft 34.

Figure 6:
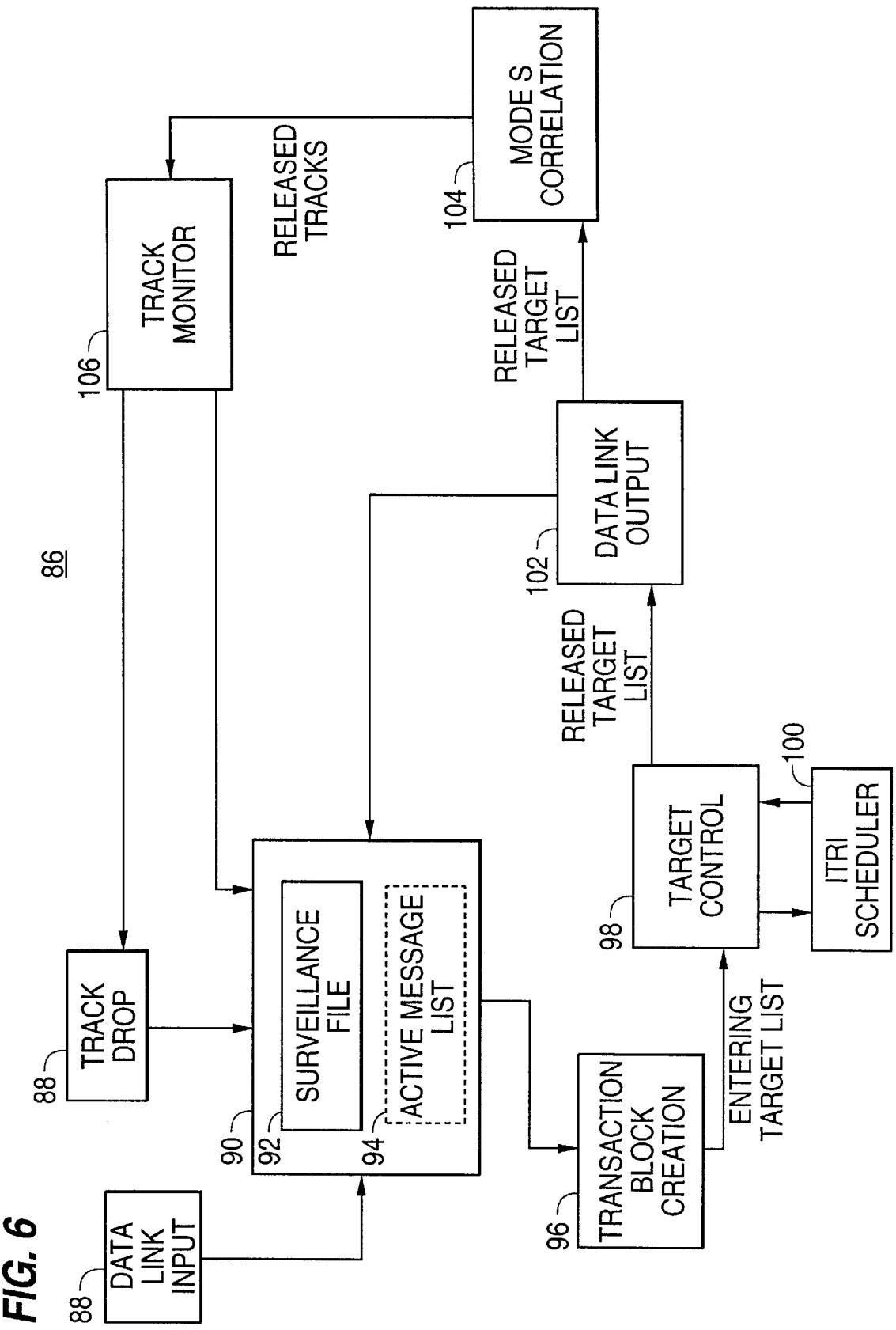
FIG. 6 is a block diagram of a synchronous loop that can utilize the present invention.

The Mode S Aircraft Tracking Application is broken down into four processing components: Channel Management, Surveillance Processing, Data Link, and Network Management. Each of these four major components is broken down further into subcomponents. Each such subcomponent is classified as being "in the synchronous loop" or "asynchronous". The synchronous loop is further broken down into tasks that are running on multiple processors, in parallel. These tasks handle a collection of tracks that are about to be in the beacon radar beam 80, in the beam 80, or up to 60 degrees after the beam. All of the aircraft tracks for data processing system 53 are maintained in a data file called the Surveillance File. Surveillance File 92 is shown in FIG. 6.

The synchronous loop tasks, starting with Transaction Preparation, hand off a group of tracks that have been processed by that loop component. The group of tracks processed by a component consists of those tracks whose azimuth is in the beam 80 dwell period (3.6 degrees for this example) which that task is processing. The components of the synchronous loop are characterized in Table 1 below.

system 53 receives Mode S data link messages from MMS 54. A data link message from MMS 54 can result in up to four Mode S COMM A data link transactions, transmitted over the RF channel, to a specific transponder such as aircraft 34 transponder 72. As shown in FIG. 6, messages received by data link input 88 are fed to storage or memory 90. Storage 90 includes surveillance file 92 and active message list 94. Inputs from data link input 88 are identified by or contained in active message list 94. The messages of active message list 94 are provided to transaction block creation 96, which creates a transaction block for each active message provided by data link input 88. Transaction block creation 96 provides a list of entering targets to target control 98. Target control 98 is controlled by, and provides feedback to, ITRI scheduler or interrogator scheduler 100. In response to the entering target list from transaction block creation 96, and control by ITRI scheduler 100, target control 98 produces a released list of targets. The released target list from target control 98 is provided to data link output 102. Data link output 102 provides the released target list from target control 98 to Mode S correlation 104. In response to the released target list from target control 98 via data link output 102, Mode S correlation 104 provides a list of released tracks to track monitor 106. Track monitor 106 provides

TABLE 1

| Component | Subcomponent | Target/Beam Position | Time Constraint | Notes |
|---|---|---|---|---|
| Channel Management | Transaction Preparation | Targets expected to be at an azimuth 15 degrees prior to the current beam position. | 48 msec. (nominal target beam dwell time) | Prepares preliminary schedule transmission time in the beam, called an "Entering Target List". |
| | Target Control | Targets about to enter the beam and immediately exiting the beam. | 8 msec. (beam period) | Hand off schedule to Interrogator Scheduler, receive completed interrogation/reply blocks from IS, transform to a "Released Target List" |
| | Interrogator Scheduler | Targets in the beam. | <8 msec. | Execute the schedule of transmissions from Entering Target List; use remaining free channel time to perform surveillance re-interrogations (for transponder's altitude) and data transmission. |
| Data Link | Data Link Output | Targets up to 22.5 degrees after the beam. | 300 msec. | Update the Active Message List entries associated with Release Target List targets. |
| Surveillance Processing | Mode S Correlation | Targets up to 22.5 degrees after the beam. | 300 msec. | Correlate Beacon Radar Reports with Mode S Transponder Tracks. Generate a Released Track List for Track Monitor. |
| | ATCRBS Correlation | Same | Same | Correlate Beacon Radar Reports with ATCRBS Tracks. |
| | Radar Correlation and Report Dissemination | Same | Same | Process Beacon Reports and Primary Radar reports to produce "dissemination" reports to Surveillance facility |
| Network Management | Track Monitor | Targets up to 45 degrees (in standard configuration) after the beam. | 600 msec. | Update tracks for "netted sensors" operations and unlock tracks in Released Track List. |

Coordination and communication among the subcomponents of Table 1 is illustrated in FIG. 6. FIG. 6 shows operation of DPS 53. Data link input 88 is one of the * 12 asynchronous subcomponents or tasks. The operation of data link input 88 in relation to the synchronous loop tasks is illustrated in FIG. 6.

In FIG. 6, synchronous loop 86 receives data from data link input 88. Data link input 88 within data processing these released tracks to surveillance file 92 of memory or storage 90. Track monitor 106 also checks successive lists of released tracks to identify any tracks that have not received position updates for a sufficiently long time (e.g. three scans of rotating antenna 18) that those tracks should be considered idle or inactive. Track monitor 106 provides any resulting list of idle tracks to track drop module 108. Track drop module 108 deletes the idle tracks from idle surveillance file 92. Data link output 102 also deletes from active message list 94 the messages that have been already processed by transaction block creation 96, target control 98 and data link output 102. Data link output 102 also provides message data back to MMS 54. FIG. 6 is preferably implemented in software.

Figure 7:
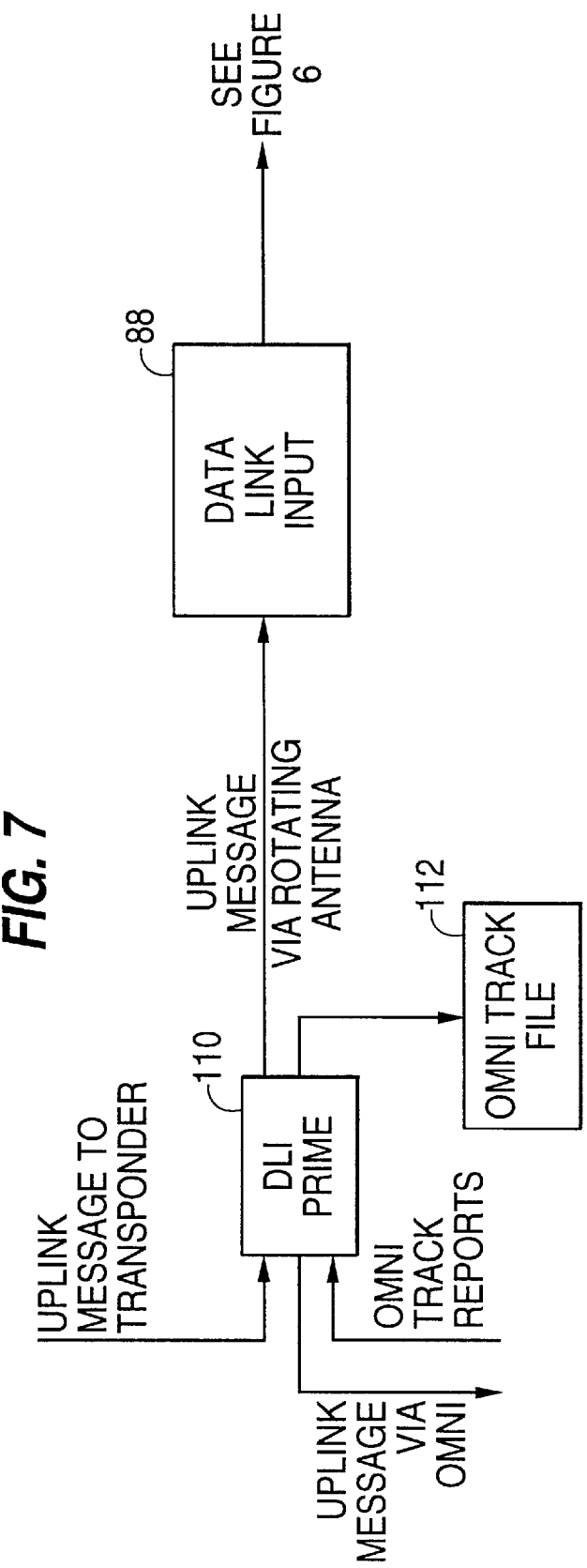
FIG. 7 is a simplified block diagram of a front end or interface according to the present invention for the synchronous loop of FIG. 6.

An additional DPS 53 task or module, data link input prime or DLI prime 110, acts as a preliminary filter for the input normally processed by data link input 88. In other words, DLI prime 110 is interposed between MMS 54 and data link input 88. The data flows to and from DLI prime 110 are illustrated in FIG. 7. As shown in FIG. 7, DLI prime 110 is provided with each uplink message intended to be provided to an external transponder such as transponder 72, and determines whether such a message is to be provided via the rotating antenna 18 or via an omnidirectional antenna 42, 44, 46 or 48. Uplink messages to be provided to an external transponder via the rotating antenna 18 are provided by DLI prime 110 to data link input 88 to be placed in the queue of active message list 94. Uplink messages to be provided instead via an omnidirectional antenna are provided to the appropriate omnidirectional antenna 42, 44, 46 or 48 by DLI prime 110. DLI prime 110 thus acts as the arbiter determining whether an uplink message to an external or distant transponder is to be transmitted to that transponder via the rotating antenna (and thus using synchronous loop 86 of FIG. 6) or via an omnidirectional antenna 42, 44, 46 or 48. DLI prime 110 also receives target tracking reports from the omnidirectional antennas 42, 44, 46 and 48, and places the information provided by those reports in omnidirectional tracking file 112.

Figure 8:
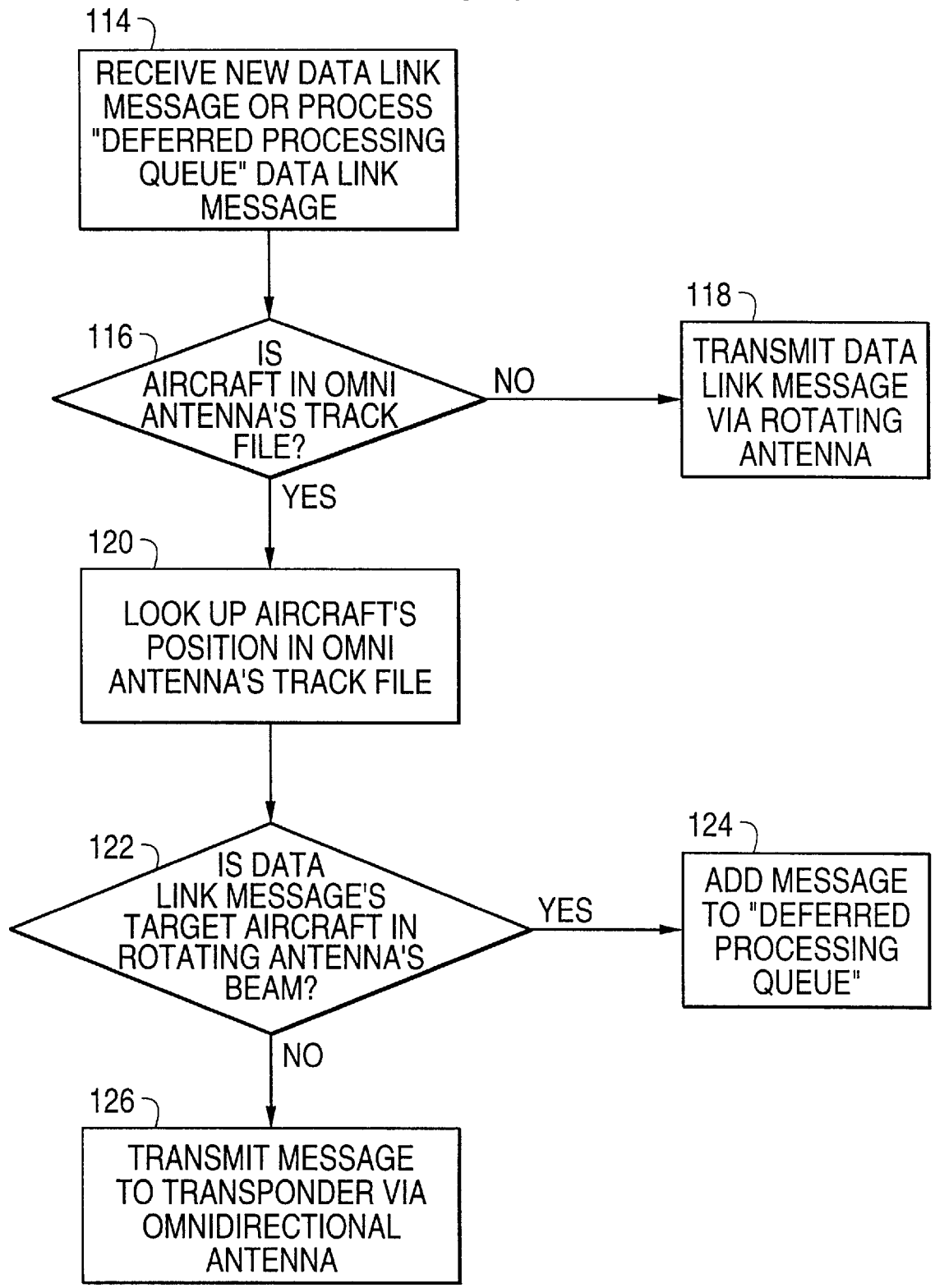
FIG. 8 is a flowchart showing operation of the interface of FIG. 7.

Operation of DLI prime 110 is shown in FIG. 8. In FIG. 8, at step 114 a new data link message is received or a "deferred processing queue" data link message is processed. After step 114, at step 116 it is determined whether the aircraft to which the message is to be transmitted can be found in the omnidirectional antenna's track file; if not, then at step 118 the data link message is transmitted to the aircraft via rotating antenna 18, otherwise at step 120 DLI prime 110 looks up the position of that aircraft in omnidirectional track file 112. After step 120, at step 122 it is determined whether the target aircraft for that data link message is then in the beam 80 of rotating antenna 18; if so, then that message is added to the deferred processing queue at step 124, otherwise at step 126 the message is transmitted to the intended external transponder via an omnidirectional antenna 42, 44, 46 or 48. Steps 114, 116 and 118 relate to routing. Steps 120, 122, 124 and 126 relate to coordination.

The routing and coordination of DLI prime 110 described herein can be implemented in software. An example of such software is given below in the C software programming language. References in the software below to CAPTS refer to workstation 60.

This code fragment illustrates the mechanism used for determining the routing of a message between the rotating and nonrotating antenna systems. A field in the incoming message was defined to allow an external user to choose the rotating or nonrotating antenna system, if desired. This capability was designed to support test activities. In practice, the user would normally choose the "algorithm" method. In this case, the system would choose which path to use. In the current implementation the choice was to use the nonrotating antenna system if the target was visible to it, and to use the rotating antenna system otherwise, since the nonrotating system will usually produce reduced latency. As more sophisticated coordination techniques are developed, more detailed analysis will be implemented to provide minimum latency scheduling when a target is visible to both antenna systems.

```
/*
* Module:
*    1.3.3.1.9                         process_message_data
* Description:
*    This module scans the local_incoming_msgs buffer to extract unique
*    Mode S IDs to be buffered into the Search ID Buffer used
*    in the Data Manager Search ID Lock call.
* Returns:
*    NONE
* Comments:
*    NONE
*/
static
process_message_data ()
{
    extern void             bcopy();
    extern CAPTS_TRACK      *capts_track();

extern DLI_MSG          Dli_msg;
    extern COMM_BUF         Local_incoming_msgs;   /* contains a
                                     local copy
                                     * of incoming DLI messages
                                     */
    auto UCHAR              antenna_choice;
    auto UCHAR              *eom_sentinel_offset;
    auto UCHAR              *incoming_msgs_offset;
    auto UINT               index;
    auto SPLIT_SHORT        msg_length;
    auto ULONG              msg_ms_id = 0;
    auto COMM_MSGS          c;
    auto MESSAGES           m;
    auto CAPTS_TRACK        *trkPtr;

/* initialize offset into buffered incoming message area */
    incoming_msgs_offset = Local_incoming_msgs.msgbuf;

for (index = 1; index <= Local_incoming_msgs.msg_count;
    index++)
    {

/* extract message's typecode and Mode S ID */
        c.test_msg = (TEST_MSG *)(incoming_offset +
            MSG_LENGTH_SIZE_BYTES +
            FAC_ID_SIZE_BYTES);

bcopy((char *)c.test_msg,(char *)&m.test_msg,
        msg_length.word-1);

switch (c.std_uplink->type_code)
        { case ATC_DOWNLINK_REQ_TYPE_CODE:
        case WCP_DOWNLINK_REQ_TYPE_CODE:
        case ATC_STD_UPLINK_TYPE_CODE:
        case WCP_STD_UPLINK_TYPE_CODE:

/*
            * Use the "exp" field
            * of the STD_UPLINK or DOWLINK_REQ messages
            to signal
            * the antenna preference, if any. The exp field will
            * be stuffed with a default * no scans to expiration value,
            * once the antenna selection value has been saved.
            */
            bcopy ((char *)&m.std_uplink, (char *)
            Dli_msg.msg_data,
                (int) msg_length.word-1);
            antenna_choice = m.std_uplink.exp;
            m.std_uplink.exp = MSG_DEFAULT_EXP;

switch (antenna_choice)
            {
            case CHOOSE_OMNI:
                data_link_to_capts(&m.std_uplink);
                break;
            case CHOOSE_ALGORITHM:
                if (capts_track(m.std_uplink.mode_s_id) ==
```

```
                (CAPTS_TRACK *)NULL)
                {
                    send_to_dli(msg_length.word, &m.std_uplink);
                }
                else
                    data_link_to_capts(&m.std_uplink);
                break;
            case CHOOSE_ROTATOR:
            default:
                send_to_dli(msg_length.word, &m.std_uplink);
                break;
            } default:
            break;
            } eom_sentinel_offset = (incoming_msgs_offset +
            MSG_LENGTH_SIZE_BYTES + msg_length.word);

/* increment offset into local_incoming_msgs to position of
         * message length field of next message in buffer
         */
        incoming_msgs_offset = eom_sentinel_offset +
            COMM_BUF_SENTINEL_SIZE_BYTES;
    }/*end for*/
}
```

Copyright © 1994 by Loral Corporation. All rights reserved.

The following code fragment illustrates the mechanism for coordinating transmission time between the rotating and nonrotating antenna systems. When a message is to be sent to a target using the nonrotating antenna system, a function is called which determines whether there would be interference between the rotating and nonrotating antenna systems for the target under consideration. If interference is possible, the message to the target is placed in a queue for later delivery, still using the nonrotating antenna system. More sophisticated techniques, such as a mechanism for adding a message to the Active Message List of a target within the beam of the rotating antenna system, are under consideration.

```
/*
 * Module:
 *     1.3.3.6.6                            data_link_to_capts
 * Description:
 *     Processing for ATC|WCP STD_UPLINK and DOWNLINK_REQ
 *     messages.
 *     Determine whether the destination transponder will be within
 *     the beam window; if it is, then defer transmitting to CAPTS,
 *     otherwise send now.
 * Returns:
 *     NONE
 * Comments:
 *     Outputs - message may be "queued" for later transmission when the
 *         beam is pointing in the same direction.
 */
void
data_link_to_capts(msgPtr)
void *msgPtr;     /* can be a STD_UPLINK or DOWNLINK_REQ **/
{
    auto CAPTS_MSG            *captsMsgPtr;
    auto CAPTS_TRACK          *trkPtr;
    auto UCHAR                trk_in_win;

if ((trkPtr = capts_track(((STD_UPLINK *)msgPtr)->mode_s_id))
        == (CAPTS_TRACK *)NULL)
    {
        format_and_send_rej_notice(Dli_msg.facility_id, msgPtr,
            TARGET_NOT_FOUND);
    }
```

```
    else
    {
        captsMsgPtr = add_capts_msg(trkPtr, msgPtr);
        if ((trk_in_win=track_in_window(trkPtr)) == FALSE)
        {
            if (((STD_UPLINK *)msgPtr)->type_code ==
            ATC_STD_UPLINK_TYPE_CODE
            ||((STD_UPLINK *)msgPtr)->type_code ==
            WCP_STD_UPLINK_TYPE_CODE)
                format_comm_a_uplink(trkPtr, captsMsgPtr);
            else
                format_ground_init_comm_b(trkPtr,
                    (DOWNLINK_REQ *)msgPtr);
            send msg_to_capts(&ModeSDataLinkMsg);
            captsMsgPtr->in_capts = !0; /* indicate msg transmitted
                to capts */
            captsMsgPtr->segmen_no++;
        }
        else
        {
            defer_message(trkPtr, msgPtr, captsMsgPtr);
        }
    }
}
```

Copyright © 1994 by Loral Corporation. All rights reserved.

The following code fragment is invoked to determine whether or not there is possible interference between the rotating antenna and the nonrotating antenna. The current implementation simply checks to see if the target position as reported by the nonrotating antenna system is within a fixed angular region around the current position of the beam of the rotating antenna. The angular region is determined by system constants which take into account the amount of time which may elapse from the time a message is sent to the nonrotating antenna system for delivery until delivery actually occurs, as well as uncertainties in the relationship between the target position being used by the two antenna systems. The latter explains the expansion of the angular region for close-in targets. In the future more selective criteria will be used, such as signaling between the scheduling function for the rotating antenna to indicate that it has completed all traffic to a specific target.

```
/*
 * Module:
 *     1.3.3.6.25                           track_in_window
 * Description:
 *     Determine if a track at a particular destination transponder will
 *     be within the beam window; if it is defer transmitting to CAPTS,
 *     otherwise send now.
 * Returns:
 *     TRUE/FALSE - target is in the beam "window".
 * Comments:
 *     Outputs - message may be "queued" for later transmission when the
 *         beam is pointing in the same direction.
 */
int
track_in_window(trkPtr)
CAPTS_TRACK *trkPtr;
{
    auto long                 beam_az;
    auto long                 earliest_az;
    auto int                  in_window;
    auto long                 latest_az;
    auto long                 range_az;
    auto USHORT               target_range;
    auto USHORT               target_azimuth;
    auto USHORT               window_width;

/* convert x,y co-ord to range and azimuth */
```

```
range_az    = capts_xy_to_range_az(trkPtr);
target_range = ((AZ_RANGE *)&range_az)->ar.range;
target_azimuth = ((AZ_RANGE *)&range_az)->ar.azimuth;

/* set beam window size in AU */
window_width = BeamWindowWidth/2;

/* compensate for near in targets (i.e. range from sensor is small) */ if (target_range < NEAR_IN_RANGE)    /* range <2 NM */
    window_width +=
        ((NEAR_IN_RANGE-target_range) * 5) / 6;

beam_az = get_current_antenna_azimuth(GRAM_SBASIC-
>current_antenna_azimuth);

earliest_az = (beam_az - window_width) & AZMASK;
latest_az = (beam_az + window_width) & AZMASK;

/*
 * handle azimuth wraparound
 */
if (latest_az > earliest_az)
        /* earliest_az <= target_azimuth <= latest_az */
    in_window = (target_azimuth >= earliest_az)
            && (targe_azimuth <= latest_az);
else
        /* !(latest_az < target_azimuth < earliest_az) */
    in_window = !((target_azimuth > latest_az)
            && (target_azimuth < earliest_az));

return (in_window);
}
Copyright © 1994 by Loral Corporation. All rights reserved.
```

Figure 9A:
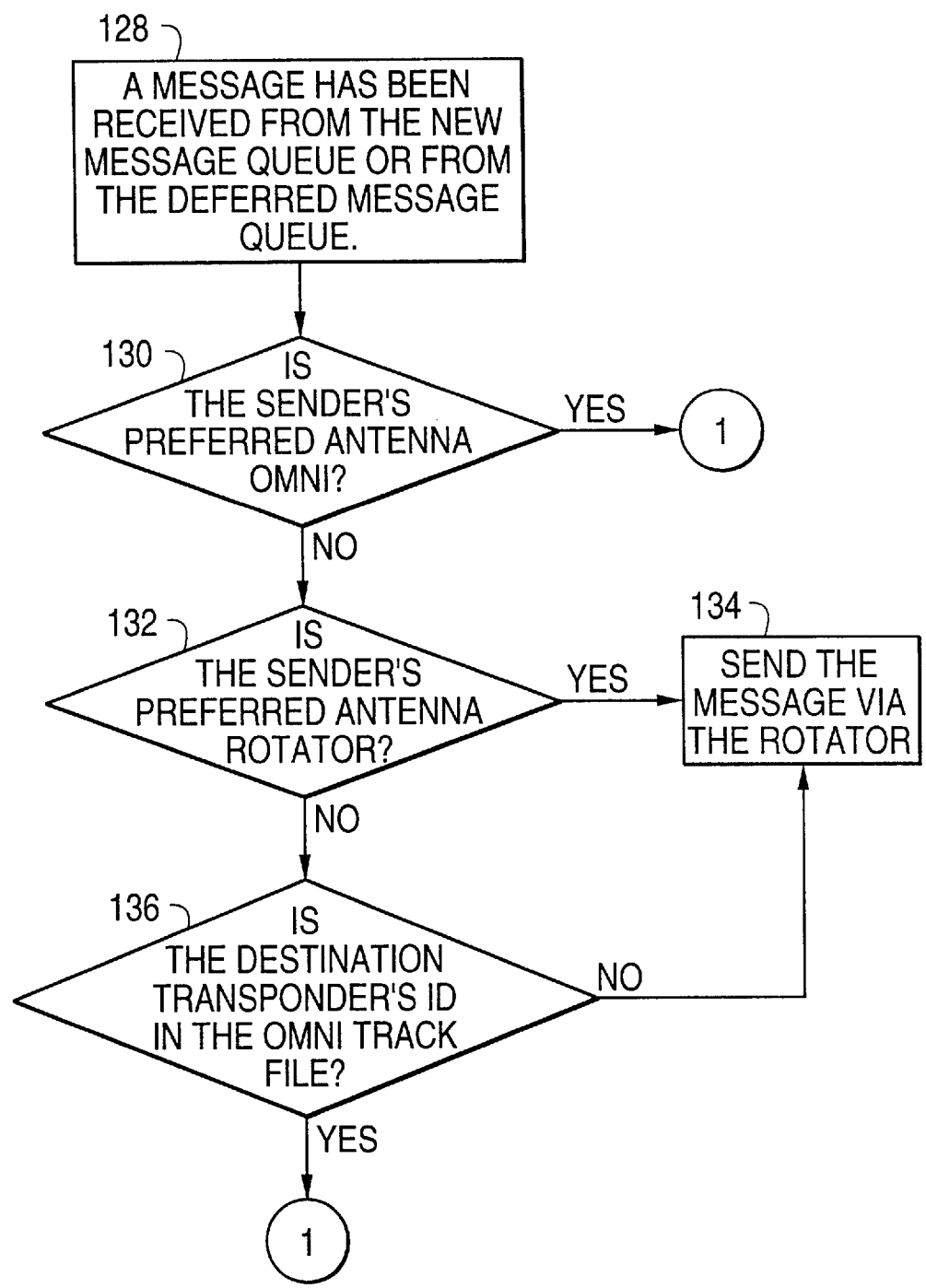
FIGS. 9A–9C show more detailed flowcharts for operation of the interface of FIG. 7.

FIG. 9A is a flowchart for the routing software listed above. In FIG. 9A, at step 128 a message has been received from the new message queue or from the deferred message queue. In response to receipt of that message, at step 130 it is determined whether the originator or sender of that message prefers using an omnidirectional or other nonrotating antenna to transmit that message. If so, then the message will be sent via such an antenna, necessitating use of the coordination code of FIG. 9B beginning with step 138. Otherwise, the method of FIG. 9A then precedes to step 132, where it is determined whether the sender's preferred antenna is a rotating antenna; if so, then at step 134 the message is sent via the rotating antenna. Otherwise, at step 136 it is determined whether the digital identification code for the transponder which is the intended destination of the message can be found in the tracking file 12 for the nonrotating antennas; if not, then at step 134 the message is sent via a rotating antenna. Otherwise, the method precedes to step 138 of FIG. 9B.

Figure 9B:
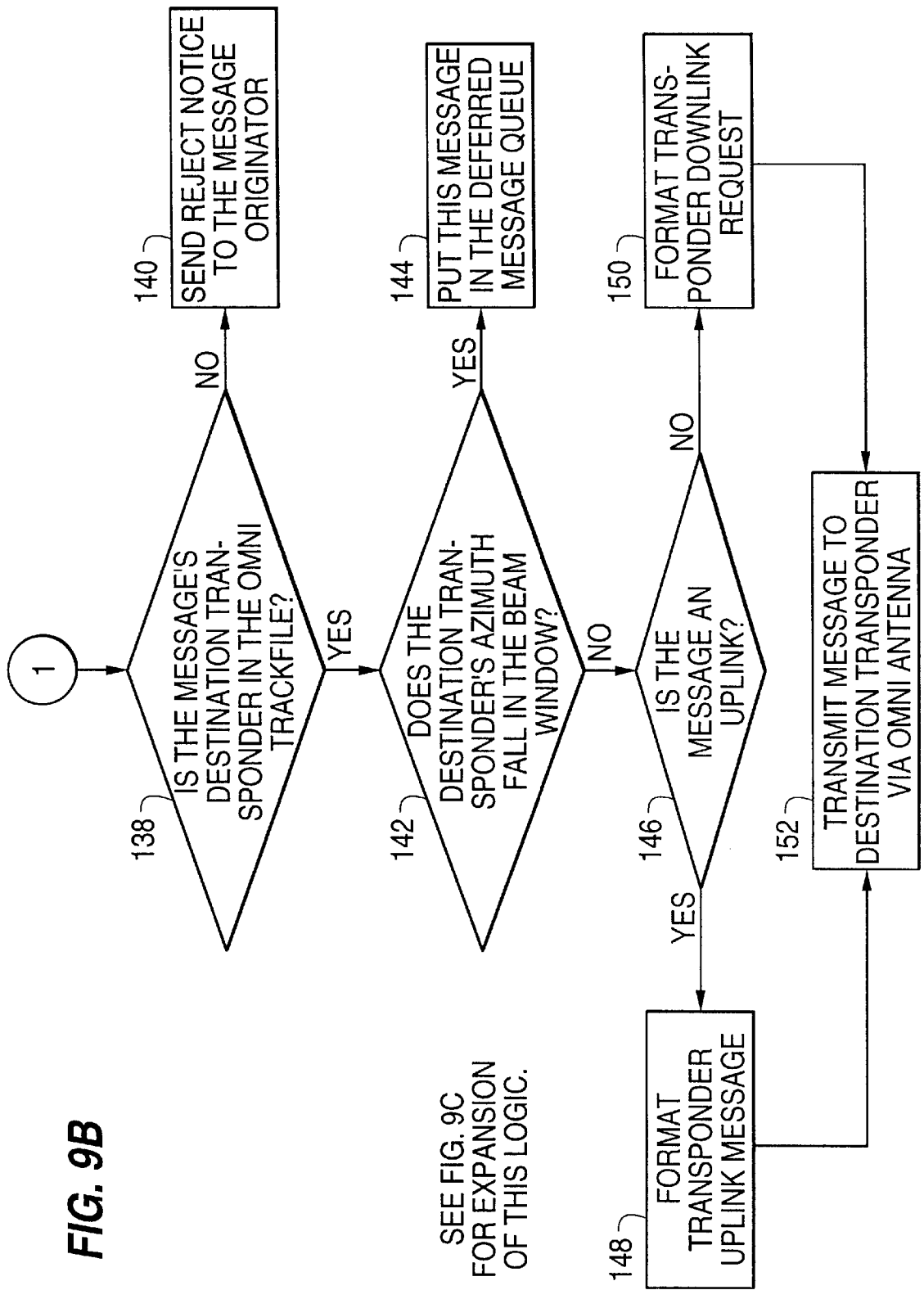

FIG. 9B is a flowchart of the second set of code listed above, relating to coordinating transmission time between the rotating and nonrotating antennas. At step 138, as in step 136, it is determined whether the transponder that is the intended destination of the message can be found in the tracking file 112 for the non-directional antennas; if not, then the method precedes to step 140, which sends a reject notice to the message originator. Note that step 138 may have been reached directly from step 130, so step 136 may not have been performed otherwise, at step 142, it is determined whether the current azimuth location of the destination transponder for that message is within the beam window; this step is shown in greater detail in FIG. 9C. If at step 142 is determined that the azimuth of the intended destination transponder falls within the beam window, then at step 144 this message is placed in the deferred message queue, because that transponder is then being transmitted to by the rotating antenna 18. Otherwise, the method of FIG. 9B then proceed to step 146, at which it is determined whether this message is an uplink; if so, then at step 148 the message is formatted as a transponder uplink. Otherwise, at step 150 the message is formatted as a transponder downlink request. After step 148 or step 150, at step 152 the message is transmitted to the intended destination transponder via an omnidirectional or nonrotating antenna.

Figure 9C:
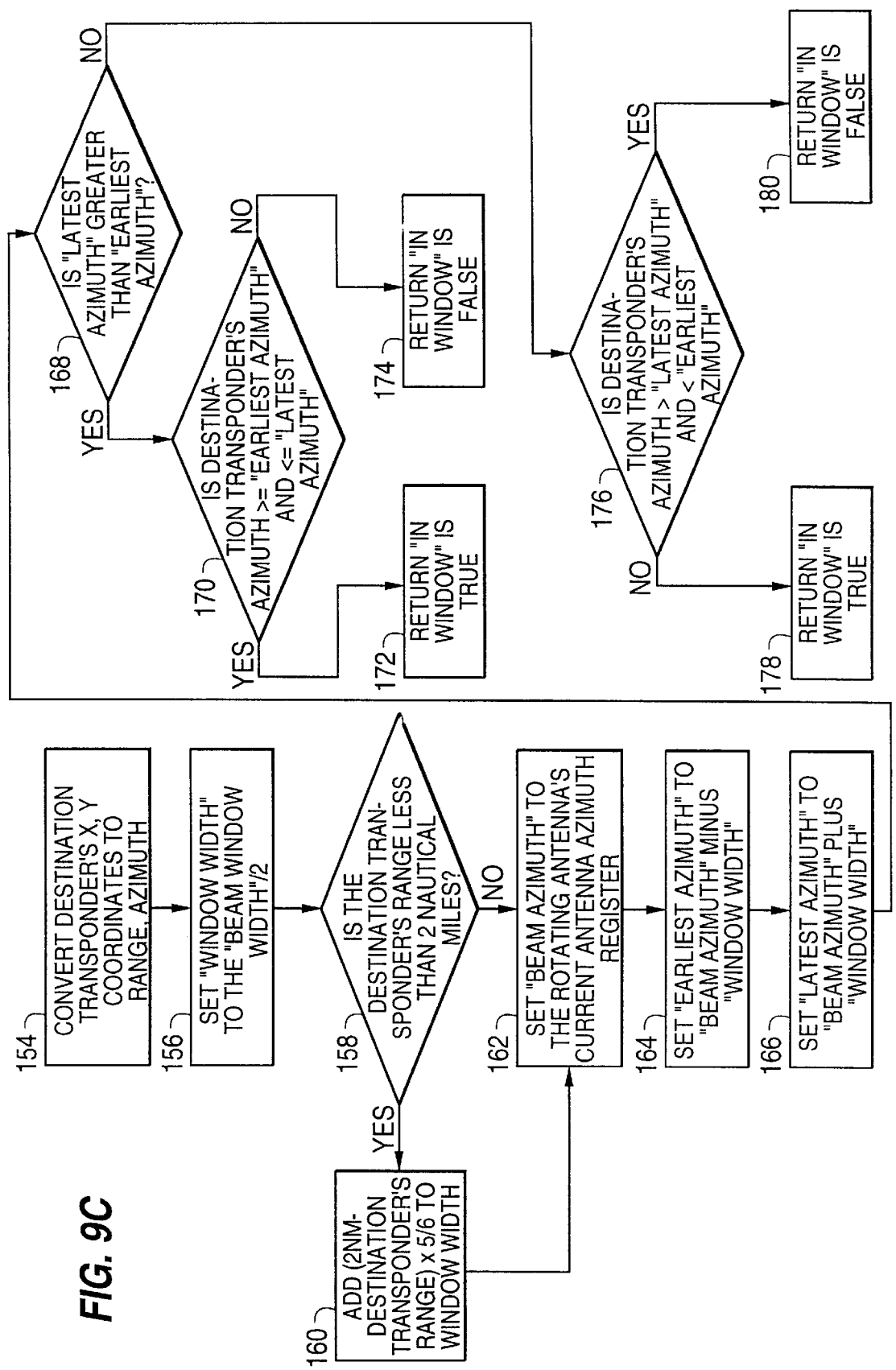

As discussed above, FIG. 9C shows step 140 of FIG. 9B in greater detail. FIG. 9C is a flowchart for the third set of code listed above, which is invoked to determine whether or not there is possible interference between the rotating antenna and the nonrotating antenna. At step 154, the X, Y coordinates of the destination transponder are converted to range and azimuth values. After step 154, the value of the window width variable is set to half of the beam window width at step 156. Next, at step 158 it is determined whether the distance to the destination transponder is least than a predetermined amount, such as two nautical miles; if so, then at step 160 the window width value is adjusted accordingly. Two nautical miles range is a common or Mode S definition of "close in"; at that or smaller ranges, changes in azimuth become more rapid. For this reason, at step 160 width is added to the window width to adjust for this more rapid change. This added amount gets larger as the target gets closer in. Otherwise, or after step 160, the value of beam azimuth is set to the value then in the Current Antenna Azimuth register for the rotating antenna 18 (step 162). Next, at step 164 the value of earliest azimuth is set to the value of beam azimuth minus the value of window width determined above. Next, at step 166 the value of latest azimuth is set to the value of beam azimuth determined at step 162, plus the value of window width determined above. Next, at step 168 it is determined whether the value of latest azimuth determined at step 166 is greater than the value of earliest azimuth determined at step 164; if so, then the method proceeds to step 170, otherwise the method proceeds to step 176. At step 170, it is determined whether the azimuth of the destination transponder is greater than or equal to the value of earliest azimuth (from step 164) and is also least than or equal to the value of latest azimuth (from step 166); if so, then the returned "in window" value is true (step 172), otherwise the returned "in window" value is false (step 174). At step 176, it is determined whether the azimuth of the destination transponder is both greater than the value of latest azimuth (from step 166) and less than the value of earliest azimuth (from step 164); if not, then the returned "in window" value is true (step 178), otherwise the returned "in window" value is false (step 180).

In the Mode S system there is a globally readable (that is readable by all of the processors) hardware register called the Current Antenna Azimuth. That hardware register indicates that azimuth in units, for example 16,384 values 0 through 16,383, that the software can read to determine where the rotating antenna 18 is currently pointing. In the flowchart of FIG. 8, that register value is read at step 122, and that register value is compared to the azimuth of the intended target, and if that target azimuth is within that azimuth register value plus or minus some beam width value, then a transmission to the aircraft is not scheduled because if the rotating antenna 18 would be used to interrogate an aircraft transponder once per scan of antenna 18 (typically for altitude), it will overwhelm the signal from or to any of the omnidirectional antennas 42, 44, 46 and 48. This is because, in this example, the signal from the rotating antenna 18 much more powerful than that from any omnidirectional antenna 42, 44, 46 or 48. So with this check, a system is thereby provided that is usable in the presence of a rotating antenna. Now, if at step 122 the aircraft is found to fall in the general direction of this beam where the rotating antenna 18 is pointing to, then at step 124 the message is placed on a queue which will be checked later to see if the antenna has moved around so that that aircraft is no longer in the beam 80 and transmission to the aircraft can then be accomplished. Without this check for the aircraft being near the beam 80 of the rotating antenna 18, each signal from an omnidirectional antenna 42, 44, 46 and 48 would be interfered with by the signal from the rotating antenna 18 because for this example there is a transmitter of about 1000 watts in the rotating antenna 18 system and a transmitter of about 100 watts in any one of the omnidirectional antenna 42, 44, 46 or 48 systems. In addition, the rotating antenna 18 provides about 21 dB of gain in the direction of the beam. Therefore, it is undesirable to have both antennas trying to transmit to an aircraft in the same general direction. As desired by the user, the width of what was considered to be the beam could be widened or a corresponding parameter could be narrowed to define how large an area of the space that the user would want to exclude transmitting to. This range would be defined by a value on either side of the actual azimuth or heading for the rotating antenna 18. For the preferred embodiment, the excluded range should be at least plus or minus one half of the beam width, since anything falling within that range would actually be in the beam. However, more sophisticated methods will alter this conclusion.

DLI prime 110 establishes tracks in a "surface track file" based on track position reports originating from the omnidirectional transmitter/receiver subsystem. The omnidirectional transmitter/receiver subsystem will track aircraft within line-of-sight of its several omnidirectional antennas 42, 44, 46 and 48. Aircraft track position reports from the omnidirectional transmitter/receiver subsystem originate from the once per second squitter from the Mode S transponder. A squitter is the unsolicited reply (which for Mode S is on the 1090 megahertz frequency) that declares the transponder's Mode S address (as a Mode S Downlink Format 11 message). If the transponder avionics includes support for a GPS positioning instrument, then the squitter can be made to contain the aircraft's current position (as a newly defined Mode S Downlink Format 17 message).

DLI prime 110 first processes messages destined for aircraft equipped with Mode S data link capable transponders. A field of the FAA's 80-14 format Standard Uplink message can be used to specify a choice of routing the Standard Uplink message through rotating antenna 18, or the omnidirectional RF subsystem, or the "fastest" choice (namely the omnidirectional subsystem, if the aircraft is then being tracked by the omnidirectional subsystem). Routing of Mode S Extended Length Messages (ELM's) by DLI prime 110 can also be performed here using the same technique.

The method of FIG. 8, and thus DLI prime 110, provides coordination with the rotating antenna 18. DLI prime 110 will prevent any uplink message transmission to a transponder from coinciding with the rotating antenna's once-per-scan surveillance interrogation and any data link interrogations specified for transmission through the rotating antenna. FIG. 5 depicts a situation where such coordination is required. This coordination will prevent the rotating antenna's signal from overwhelming the transmission of the omnidirectional antenna (since for this example the rotator provides a much more powerful signal than does the omnidirectional antenna) and also diminishes signal garbling during the rotating antenna's normal transmission of a "surveillance" interrogation. A key portion of the method used to coordinate the omnidirectional system's transmission is depicted as step 122 of the flowchart of FIG. 8. The Mode S data processing system 53 contains a globally readable register called the "Current Antenna Azimuth" (in azimuth units, with 16,384 azimuth units in 360 degrees, with a value of 0 indicating that the rotator beam is centered on north, with a value of 8192 indicating that the rotator beam is centered on south, and with 4096 azimuth units equaling 90 degrees). If the current azimuth of the message's destination aircraft is within a defined number of azimuth units of the Current Antenna Azimuth (as read out of the Current Antenna Azimuth register), then the system 53 will defer transmitting the message by placing that message in a deferred message transmission queue, which will be examined at a later time. At that later time, the antenna will be continuing on its rotation and will no longer be pointing in the direction of the intended destination aircraft, so that the transmission garbling problem is thereby avoided. The defined number of azimuth units includes the actual beam 80 width plus an allowance for message delivery time based on known system timing.

Antennas 42, 44, 46 and 48 have been referred to above as omnidirectional or as nonrotating. As used herein, a nonrotating antenna is an antenna that neither has a physical rotation, nor has a beam that is electronically swept. Electronically swept, as used in the immediately preceding sentence, includes both a full 360° sweep, and a partial sweep with azimuth gaps in antenna sweep coverage. An omnidirectional antenna is a nonrotating antenna. A nonrotating antenna can be, but need not be, an omnidirectional antenna. For example, antennas 42, 44, 46 and 48 can each for example be a nonrotating antenna having an antenna pattern that is customized to a specific application. For example, if such an antenna is placed or installed at an airport that is near a mountain, then there may be no need to have such an antenna transmit towards that mountain. An azimuthal gap in antenna coverage would then be desirable.

The above system and method have the following advantages. They may be used for applications where faster data link message delivery times are required, since the typical latency for data link messages is reduced to on the order of 100 milliseconds versus 4.6 seconds with a rotational antenna. The data link transmission duty cycle for a particular aircraft is not limited to the rotating antenna's beam dwell period (for this example, on the order of 30 to 50 milliseconds), so that much more data may be transmitted to the aircraft over the same time period. For tracking applications requiring faster than a 4.6 second position update rate (e.g. precision runway monitoring), the system will typically update the position of Mode S equipped aircraft once per second, if sufficient omnidirectional or other nonrotating antennas are situated at a site to ensure a high enough probability of detection or if the aircraft is equipped with GPS position reporting capability.

The present invention is particularly well suited for communications between ground-based entities and aircraft. A rotating Mode S antenna can be combined with a nonrotating system which can communicate with a target at any time, thus increasing communications capacity and/or reducing communications latency. The present invention provides temporal separation between the rotating and nonrotating antenna operations; synchronization of the transmission is provided to avoid interference. The positional data that is used for synchronization is provided by the data from the nonrotating antenna, rather than from the rotating antenna. This has the advantage that the nonrotating system could then be used without the rotating antenna system, although if used this way then there is no need for synchronization. Furthermore, the present invention uses an omnidirectional antenna which is more economical than, for example, an electronically scanned antenna. This allows the present invention to provide communications to targets on the ground.

The present invention accomplishes coordination between transmission from a rotating antenna and transmission from an omnidirectional antenna. An omnidirectional antenna is cheaper to use than an electronically steerable antenna. However, the beam of a rotating antenna would be considerably stronger than the emission from an omnidirectional antenna and would in effect drown out the signal from the non-directional antenna. Accordingly, the emission from the omnidirectional antenna is temporally controlled. In other words, the omnidirectional antenna is shut off while the beam from the rotating antenna is illuminating an intended target of the omnidirectional antenna. The heading of the rotating antenna is continually changing because of the rotation, and this heading is contained in a register called the Current Antenna Azimuth. For one embodiment of a Mode S rotating directional antenna, the width of the beam is known to be 3.6 degrees wide. For that situation, a 50 percent pad could be added on either side of that arc width for a total width of 7.2 degrees, or 3.6 degrees on either side of the current instantaneous heading of the rotating antenna. How this is accomplished is shown in FIG. 8 and in FIGS. 9A–9C. However, the 50% pad on either side of the arc width is to be distinguished from the spacing or beam width on either side of the instantaneous antenna heading or azimuth of the rotating antenna 18.

The present invention provides data communication, and coordinates a mechanically rotating system and omnidirectional transmission. The present invention coordinates the transmission between one or more omnidirectional transmitters and at least one rotating antenna so that targets that are intended to be transmitted to via an omnidirectional transmitter are not presently in the beam of the rotating antenna. Delay time in Mode S data link transmissions is thereby reduced. The present invention coordinates between the rotator antenna and the omnidirectional antenna. When the rotating antenna is pointing north and it is desired to transmit to a target that is at north, that transmission is not sent from the omnidirectional antenna at the same time that the rotator is at north. Instead, it is necessary to wait until the rotator has moved sufficiently away from due north that the target would be sufficiently clear of the beam of the rotating antenna that a transmission from an omnidirectional antenna would not be interfered with. North can be determined from the rotator's position file on the target that is known to be north. If the target is on the ground, then the omnidirectional system would relate the target and the antennas into position. A transponder has two techniques for declaring its position. In one approach, it would transmit its identification so that triangulation can be used to determine the position of the aircraft directionally; if the target is within or sufficiently close to the polygon defined by the location of the omnidirectional antennas, then it is possible to also determine the range of that target. If the target is too far outside that polygon, then the direction of the target can still be determined, even if its range cannot be determined. Alternatively, if the aircraft is on the ground and is equipped with a GPS position system, then with an appropriate transponder it could transmit its current GPS position, thereby providing redundant means for determining the position of the aircraft or other target.

Presently, there is an FAA initiative called Airport Surface Traffic Automation (ASTA) to communicate with targets on an airport surface. Presently, Mode S provides communications only with airborne targets such as airplanes in flight. If Mode S is to be extended to also cover surface targets (airplanes on the runway or taxiway), then the present invention is needed to do so. Briefly, the present invention permits simultaneous use of a rotating directional antenna and one or more nonrotating antennas. The objective is to provide a data link for surface targets as well as flying targets. If only omnidirectional antennas are used, then their signals would interfere with each other. A rotating antenna has only a narrow beam and should itself cause little interference taken alone. However, if both a rotating antenna and nonrotating antennas are used, then there would be considerable interference between their signals. The present invention provides a system and technique for minimizing such interference. The present invention thereby provides a data link for close in and surface targets without the latency of a rotating antenna, provides surveillance of surface targets, minimizes interference between the rotating antenna and omnidirectional antennas, and permits use of Global Positioning System (GPS) data for surface surveillance.

The present invention provides apparatus and method such as for Mode S for adding capability to provide the coordination to allow for interrogations by nonrotating sensors, both interrogation timing (optimization of when data is transmitted/received), and transmission path optimization (optimizing which sensor is to transmit or receive data and at what direction). Multiple sensor coordination is provided.

Data processing subsystem (DPS) 53 is the processing element that creates all scheduling of interrogations on rotating antenna 18, and furthermore has the capability to provide the coordination necessary to allow for interrogations by nonrotating antennas 42, 44, 46 and 48 that are interfaced to DPS 53.

Interrogation timing means when data is transmitted or received by a given antenna. The present invention prevents one antenna from interfering with another. The coordination of multiple antennas is likely to fall into one of three categories. In the first category, no coordination may be required. In this case, the effects of interrogations by other than the rotating antenna 18 cause negligible effect on the operation of the system and on the population of transponders within the range of these added interrogators. This approach might be adequate for a lightly loaded terminal environment. In the second category, interrogations could be scheduled only during times that the rotating antenna 18 is facing away. In this situation, interrogations from a set of remote sensors are limited to times when the rotating antenna 18 is directed into another coverage area that does not substantially overlap with the coverage area of those remote sensors. The third category is scheduling remote interrogator time. In this case, the scheduling software allocates time between all sensors, taking into account the existing scheduling rules, and prioritizes messages based on criticality of the message type. That is, critical messages are scheduled before noncritical messages, or messages that require delivery before the rotational delay are sent on a nonrotating antenna. Because of the narrow beam and rotational delays of the rotating antenna 18, there are times when interrogation is inactive on a rotating antenna; this time can be filled by interrogations from other antennas. See FIG. 10. By including DPS 53 in the interrogation process, the required level of coordination can be achieved.

Transmission path optimization means which antenna transmits an interrogation, or has coverage of a reply, and in what direction. In a terminal or airport area, Mode S antenna or sensor augmentation will exist in one or more ways. Nonrotating antennas may have coverage patterns that vary and overlap. It is possible that the antennas used to receive may be different from those for transmission. If data link messages are to be sent to airborne targets, antenna selection decisions are made. For example, if a message is intended for a target within the coverage area of both a rotating antenna and a nonrotating antenna, it is determined which antenna will be used. If the messages are noncritical, it is determined whether it is better to wait and use the rotating antenna, to leave the nonrotating antennas free for more time-critical traffic. It is possible for a message provided by the FAA ATN network on one system to interfere with a Mode S Specific Services (MSSS) message on another network. DPS 53 controls the scheduling of both the rotating and nonrotating antennas. A single ATN router connection feeds DPS 53. DPS 53 manages the antenna resources in terms of interrogation and coverage. DPS 53 provides the most optimized communications management of the entire coverage volume (airspace and surface). ATN messages are handled as required by the appropriate rotating and nonrotating systems. Mode S Specific Services messages are given priority and are scheduled most expediently and take into account target location and range. With multiple antennas, particularly antennas of broad coverage patterns, replies from aircraft may be detected from more than one antenna. Especially when more than one rotating antenna is used, it is necessary to provide message delivery when targets move from the coverage of one antenna to the coverage of another. In addition, each installation may have unique requirements for coverage. With DPS 53 acting as integration processor for multiple antennas, it acts as a highly available common element of system 52.

System 52 provides seamless data link coverage. Rotating antenna 18 covers the area to the extent of coverage of the beam 80, where the message density is relatively low. As a target nears the airport 10 terminal, within about 15 miles or so, a combination of rotating and nonrotating antennas can be used to maintain data link services. The choice of which antenna is to be used depends on real time knowledge of the loading of the system and location of the targets. On the surface, nonrotating antennas 42, 44, 46 and 48 pick up the coverage of a target. This seamless coverage simplifies routing of messages, and optimizes utilization of the channel.

DPS 53 provides routing based on position and priority, considering the importance of the message, whether beam 80 of rotating antenna 18 had just missed or passed by the target, and determining whether any latency of waiting return of that beam to the target would be a problem.

DPS 53 has a tracking file, which is a database having target identification number, azimuth, altitude and current direction of travel. If a track is thereby established, and it is assumed that the target has moved and its location is predicted for the next transmission. DPS 53 uses the tracking file to make routing decisions in real time.

The mechanism described above for coordination, although adequate for relatively low data rate applications, only prevents interference of the rotating antenna system with message transmission from the nonrotating antenna system. Interference of a message transmission from any nonrotating antenna with message transmission from a rotating antenna is avoided in the approach described above by keeping the power or amplitude of a transmission from a nonrotating antenna less than (e.g. an order of magnitude less than) the power or amplitude of a coincident or simultaneous transmission from a rotating antenna. Several other methods are possible, some of which take advantage of the fact that the DPS 53 schedules the interrogations to targets from the rotating antenna, and thus has all necessary knowledge to closely coordinate its operations with those of the nonrotating antenna system. Alternative mechanisms for coordinating rotating and nonrotating antenna systems include the following.

Azimuth accuracy can be improved for close-in targets. The above-described mechanism expands the interference zone for close-in targets due to the uncertainty in prediction by the Mode S rotating antenna system. The once-per-second position updates from the nonrotating antenna system can be used to reduce this uncertainty and thus reduce latency for close-in targets when messages are received close to the beam position. Since the above-described system is designed to service on-the-ground targets, which are always close in, this could provide a substantial improvement.

As another alternative, azimuth information can be provided to the nonrotating antenna system to allow it to predict the direction of the rotating antenna beam. This can be done once a scan by sending a message to each Mode S Calibration and Performance Monitoring Equipment (CPME) containing the current antenna azimuth, which message can then be rebroadcast by the CPME as a reply readable by the nonrotating antenna systems. This alternative provides an antenna reference point adequate to predict future antenna position for one scan. This alternative provides the same type of coordination mechanism as in the implementation described above, but would allow the DPS 53 to send messages without DPS 53 coordinating the systems. The workstation 60 would provide the necessary coordination to avoid interference.

As another alternative, synchronizing clocks between the rotating and nonrotating antenna system, and providing details of the rotating antenna system's predicted scheduling to the nonrotating antenna system, allows decisions to be made there. For example, GPS time can be used in both systems to provide synchronization, and high-speed communication lines can be used to send predicted noninterrogation times to designate permitted times for the nonrotating antenna system to transmit. The speed of the transmission lines determines the granularity which can be achieved. In this alternative also, DPS 53 sends messages without coordinating the systems, and interference is avoided in the remote sensor system.

As another alternative, integrating the functions of the workstation 60 into DPS 53 avoids transmission delays between the two systems 60 and 53. In this approach, messages are transmitted to the appropriate receiver/transmitters from DPS 53 with message identifiers, and send signals enabling individual messages for transmission when no scheduling activity is taking place on the rotating antenna 18. This approach provides for full synchronization of the activities of the rotating and nonrotating antenna systems.

Figure 10:
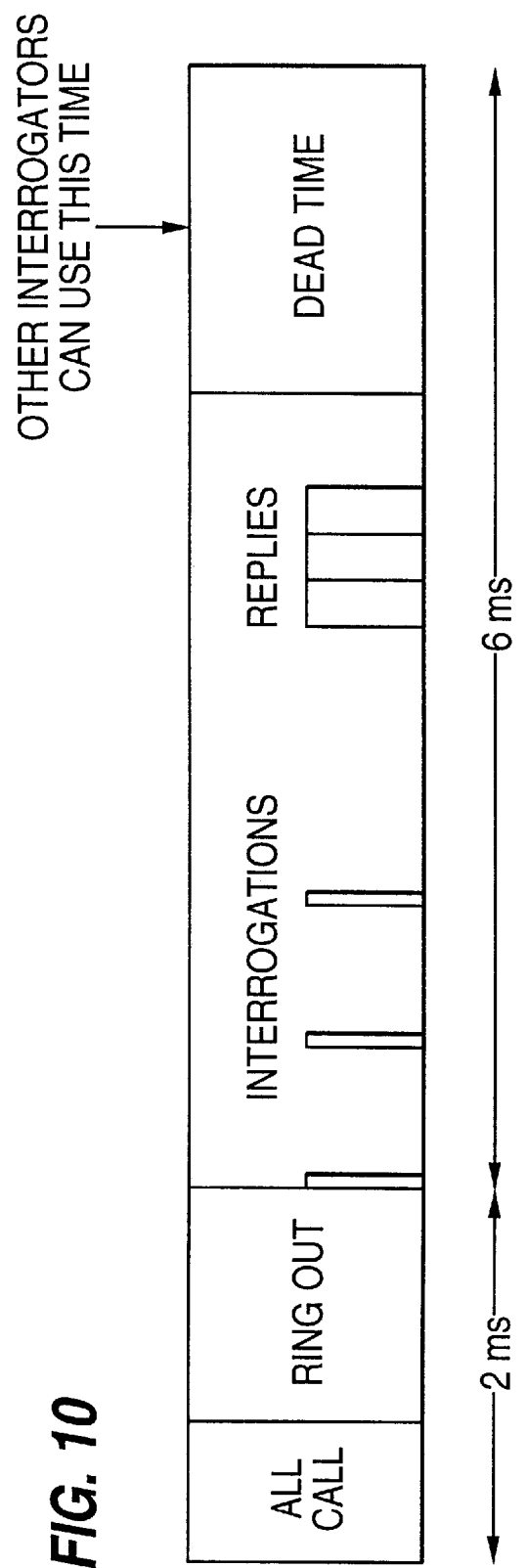
FIG. 10 shows one period of a repetitive periodic signal according to an embodiment of the present invention.

FIG. 10 shows how available bandwidth and transmission time can be maximized. A repetitive period of 8 milliseconds is illustrated for this example, 8 milliseconds being a sufficient all call frequency to track targets having transponders that are not Mode S transponders. At the beginning of the first two milliseconds of the time segment shown in FIG. 10, an all call signal is sent out, asking all targets receiving the message to respond, for example with their current position. During this two millisecond period, response from the all call interrogation from even the most distant target receiving the all call interrogation are received. This period includes a ringout period to allow replies from distant, nontracked targets to subside. The all call signal is sent out by the rotating antenna. After all call and ring out, six milliseconds of the 8 millisecond period of FIG. 10 are reserved for roll call communications. As discussed above, each Mode S transponder has its own unique digital identification. Each roll call message is thereby addressed to an individual transponder. The number of roll call messages corresponds to the number of transponders to which such messages are to be sent. Particularly if a rotating antenna is used to transmit the roll call messages, the roll call transmissions should be arranged in inverse target range order. In the example shown in FIG. 10, the roll call period includes three transmissions, a waiting period for response, and three replies. Each such transmission and each such reply is from a different transponder. A final portion of the roll call segment, represents leftover time which is used by other interrogators. The used bandwidth of a channel is thereby maximized.

Updating position using the rotator can only occur once per rotating antenna 18 sweep, for example once every 4.8 seconds. Updating position close-in once per second using the omnidirectional antennas allows the air traffic controller to permit an approaching aircraft to make faster or more economical approaches.

An aircraft borne transponder can for example squit or send out unsolicited its phase once per second plus or minus a random permutation of time. This random permutation would be a stochastic variable added of one tenth of a second to one hundredth of a second.

The rotator sweeps its beam through 360 degrees of arc, once per revolution. This beam is used for active surveillance, to ask an external transponder where it is. An omnidirectional antenna could receive the response from the transponder. An omnidirectional antenna would also receive an unsolicited message transmission from that transponder. The omnidirectional antenna would be more likely than the directional antenna to receive such signals because the rotating antenna has a narrow beam. Also, if the rotating antenna was not expecting to receive a squit, and receives a squit, then confusion in the processing circuitry could result.

Redundancy is provided for reporting aircraft position. An aircraft having GPS capability could report its position such as with a squitter. A rotating antenna could find distance to a target using time delay between transmission to a target and receipt of a reply.

Although the Mode S system is referred to above, the coordination and routing provided by the present invention is applicable to other systems.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method for routing a message to either a rotating directional antenna or a nonrotating antenna, comprising the steps of:

establishing in a storage device a list of one or more targets for a nonrotating antenna;

receiving a message which contains information designating an intended recipient of that message;

determining whether the intended recipient of the message is in the list of targets; and if the intended recipient of the message is in the list of targets, then providing the message to a nonrotating antenna for transmission, otherwise providing the message to a rotating antenna for transmission.

2. Apparatus for routing a message to either a rotating directional antenna or a nonrotating antenna, comprising:

means for establishing in a storage device a list of one or more targets for a nonrotating antenna;

means for receiving a message which contains information designating an intended recipient of that message;

means for determining whether the intended recipient of the message is in the list of targets; and means for, if the intended recipient of the message is in the list of targets, then providing the message to a nonrotating antenna for transmission, otherwise providing the message to a rotating antenna for transmission.

3. A method for coordinating operation of a nonrotating antenna with operation of a rotating antenna having at least one beam of known width, to prevent the rotating antenna from interfering with the nonrotating antenna, comprising the steps of:

first determining the position of an intended recipient of a signal from the nonrotating antenna;

second determining whether the position of the intended recipient, as determined by said first determining step, is then within a beam of the rotating antenna; and if not, then transmitting the signal via the nonrotating antenna, otherwise storing the signal in a queue for reconsideration at a later time.

4. Apparatus for coordinating operation of a nonrotating antenna with operation of a rotating antenna having at least one beam of known width, to prevent the rotating antenna from interfering with the nonrotating antenna, comprising:

first determining means for determining the position of an intended recipient of a signal from the nonrotating antenna;

second determining means for determining whether the position of the intended recipient, as determined by said first determining means, is then within a beam of the rotating antenna; and means for if not, then transmitting the signal via the nonrotating antenna, otherwise storing the signal in a queue for reconsideration at a later time.

5. A method for transmitting a signal via a rotating antenna or a nonrotating antenna, wherein the rotating antenna has at least one beam of known width, said method comprising the steps of:

establishing in a storage device a list of one or more targets for a nonrotating antenna;

receiving a message which contains information designating an intended recipient of that message;

first determining whether the intended recipient of the message is in the list of targets; and if the intended recipient of the message is not in the list of targets, then providing the message to a rotating antenna for transmission;

if the intended recipient is in the list of targets, then second determining the position of the intended recipient of the message from the nonrotating antenna;

third determining whether the position of the intended recipient, as determined by said second determining steps is then within a beam of the rotating antenna; and if not, then transmitting the message via the nonrotating antenna, otherwise storing the message in a queue for reconsideration at a later time.

6. Apparatus for transmitting a message via a rotating antenna or a nonrotating antenna, wherein the rotating antenna has at least one beam of known width, said apparatus comprising:

means for establishing in a storage device a list of one or more targets for a nonrotating antenna;

means for receiving a message which contains information designating an intended recipient of that message;

first determining means for determining whether the intended recipient of the message is in the list of targets;

means for, if the intended recipient of the message is not in the list of targets, then providing the message to a rotating antenna for transmission;

second determining means for, if the intended recipient is in the list of targets, then determining the position of the intended recipient of the message from the nonrotating antenna;

third determining means for determining whether the position of the intended recipient, as determined by said second determining means, is then within a beam of the rotating antenna; and if not, then transmitting the message via the nonrotating antenna, otherwise storing the message in a queue for reconsideration at a later time.

7. In a ground-based radar system including a rotating directional antenna and a nonrotating antenna, a method for routing a message to either the rotating directional antenna or the nonrotating antenna, comprising the steps of:

establishing in a storage device a list of one or more targets for a nonrotating antenna;

receiving a message which contains information designating an intended recipient of that message;

determining whether the intended recipient of the message is in the list of targets; and if the intended recipient of the message is in the list of targets, then providing the message to a nonrotating antenna for transmission, otherwise providing the message to a rotating antenna for transmission.

8. In a ground-based radar system including a rotating directional antenna and a nonrotating antenna, apparatus for routing a message to either the rotating directional antenna or the nonrotating antenna, comprising:

means for establishing in a storage device a list of one or more targets for a nonrotating antenna;

means for receiving a message which contains information designating an intended recipient of that message;

means for determining whether the intended recipient of the message is in the list of targets; and means for, if the intended recipient of the message is in the list of targets, then providing the message to a nonrotating antenna for transmission, otherwise providing the message to a rotating antenna for transmission.

9. In a ground-based radar system including a rotating antenna and a nonrotating antenna, a method for coordinating operation of the nonrotating antenna with operation of the rotating antenna to prevent the rotating antenna from interfering with the nonrotating antenna, wherein the rotating antenna has at least one beam of known width, said method comprising the steps of:

first determining the position of an intended recipient of a signal from the nonrotating antenna;

second determining whether the position of the intended recipient, as determined by said first determining step, is then within a beam of the rotating antenna; and if not, then transmitting the signal via the nonrotating antenna, otherwise storing the signal in a queue for reconsideration at a later time.

10. In a ground-based radar system including a rotating antenna and a nonrotating antenna, apparatus for coordinating operation of the nonrotating antenna with operation of the rotating antenna to prevent the rotating antenna from interfering with the nonrotating antenna, wherein the rotating antenna has at least one beam of known width, said apparatus comprising:

first determining means for determining the position of an intended recipient of a signal from the nonrotating antenna;

second determining means for determining whether the position of the intended recipient, as determined by said first determining means, is then within a beam of the rotating antenna; and means for if not, then transmitting the signal via the nonrotating antenna, otherwise storing the signal in a queue for reconsideration at a later time.

11. In a ground-based radar system including a rotating antenna and a nonrotating antenna, a method for transmitting a message via the rotating antenna or the nonrotating antenna, wherein the rotating antenna has at least one beam of known width, said method comprising the steps of:

establishing in a storage device a list of one or more targets for a nonrotating antenna;

receiving a message which contains information designating an intended recipient of that message;

first determining whether the intended recipient of the message is in the list of targets; and if the intended recipient of the message is not in the list of targets, then providing the message to a rotating antenna for transmission;

if the intended recipient is in the list of targets, then second determining the position of the intended recipient of the message from the nonrotating antenna;

third determining whether the position of the intended recipient, as determined by said second determining step, is then within a beam of the rotating antenna; and if not, then transmitting the message via the nonrotating antenna, otherwise storing the message in a queue for reconsideration at a later time.

12. In a ground-based radar system including a rotating antenna and a nonrotating antenna, apparatus for transmitting a message via the rotating antenna or the nonrotating antenna, wherein the rotating antenna has at least one beam of known width, said apparatus comprising:

means for establishing in a storage device a list of one or more targets for a nonrotating antenna;

means for receiving a message which contains information designating an intended recipient of that message;

first determining means for determining whether the intended recipient of the message is in the list of targets;

means for, if the intended recipient of the message is not in the list of targets, then providing the message to a rotating antenna for transmission;

second determining means for, if the intended recipient is in the list of targets, then determining the position of the intended recipient of the message from the nonrotating antenna;

third determining means for determining whether the position of the intended recipient, as determined by said second determining means, is then within a beam of the rotating antenna; and if not, then transmitting the message via the nonrotating antenna, otherwise storing the message in a queue for reconsideration at a later time.

13. A method for routing digital data to either a rotating directional antenna or a nonrotating antenna, comprising the steps of:

establishing in a storage device a list of one or more targets for a nonrotating antenna;

receiving digital data which contains information designating an intended recipient of that digital data;

determining whether the intended recipient of the digital data is in the list of targets; and if the intended recipient of the digital data is in the list of targets, then providing the digital data to a nonrotating antenna for transmission, otherwise providing the digital data to a rotating antenna for transmission.

14. Apparatus for routing digital data to either a rotating directional antenna or a nonrotating antenna, comprising:

means for establishing in a storage device a list of one or more targets for a nonrotating antenna;

means for receiving digital data which contains information designating an intended recipient of that digital data;

means for determining whether the intended recipient of the digital data is in the list of targets; and means for, if the intended recipient of the digital data is in the list of targets, then providing the digital data to a nonrotating antenna for transmission, otherwise providing the digital data to a rotating antenna for transmission.

15. A method for coordinating operation of a nonrotating antenna with operation of a rotating antenna having at least one beam of known width, to prevent the rotating antenna from interfering with the nonrotating antenna, comprising the steps of:

first determining the position of an intended recipient of digital data from the nonrotating antenna;

second determining whether the position of the intended recipient, as determined by said first determining step, is then within a beam of the rotating antenna; and if not, then transmitting the digital data via the nonrotating antenna, otherwise storing the digital data in a queue for reconsideration at a later time.

16. Apparatus for coordinating operation of a nonrotating antenna with operation of a rotating antenna having at least one beam of known width, to prevent the rotating antenna from interfering with the nonrotating antenna, comprising:

first determining means for determining the position of an intended recipient of digital data from the nonrotating antenna;

second determining means for determining whether the position of the intended recipient, as determined by said first determining means, is then within a beam of the rotating antenna; and means for if not, then transmitting the digital data via the nonrotating antenna, otherwise storing the digital data in a queue for reconsideration at a later time.

17. A method for transmitting digital data via a rotating antenna or a nonrotating antenna, wherein the rotating antenna has at least one beam of known width, said method comprising the steps of:

establishing in a storage device a list of one or more targets for a nonrotating antenna;

receiving digital data which contains information designating an intended recipient of that digital data;

first determining whether the intended recipient of the digital data is in the list of targets; and if the intended recipient of the digital data is not in the list of targets, then providing the digital data to a rotating antenna for transmission;

if the intended recipient is in the list of targets, then second determining the position of the intended recipient of digital data from the nonrotating antenna;

third determining whether the position of the intended recipient, as determined by said second determining step, is then within a beam of the rotating antenna; and if not, then transmitting the digital data via the nonrotating antenna, otherwise storing the digital data in a queue for reconsideration at a later time.

18. Apparatus for transmitting digital data via a rotating antenna or a nonrotating antenna, wherein the rotating antenna has at least one beam of known width, said apparatus comprising:

means for establishing in a storage device a list of one or more targets for a nonrotating antenna;

means for receiving digital data which contains information designating an intended recipient of that digital data;

first determining means for determining whether the intended recipient of the digital data is in the list of targets;

means for, if the intended recipient of the digital data is not in the list of targets, then providing the digital data to a rotating antenna for transmission;

second determining means for, if the intended recipient is in the list of targets, then determining the position of the intended recipient of digital data from the nonrotating antenna;

third determining means for determining whether the position of the intended recipient, as determined by said second determining means, is then within a beam of the rotating antenna; and if not, then transmitting the digital data via the nonrotating antenna, otherwise storing the digital data in a queue for reconsideration at a later time.

19. In a ground-based radar system including a rotating directional antenna and a nonrotating antenna, a method for routing digital data to either the rotating directional antenna or the nonrotating antenna, comprising the steps of:

establishing in a storage device a list of one or more targets for a nonrotating antenna;

receiving digital data which contains information designating an intended recipient of that digital data;

determining whether the intended recipient of the digital data is in the list of targets; and if the intended recipient of the digital data is in the list of targets, then providing the digital data to a nonrotating antenna for transmission, otherwise providing the digital data to a rotating antenna for transmission.

20. In a ground-based radar system including a rotating directional antenna and a nonrotating antenna, apparatus for routing digital data to either the rotating directional antenna or the nonrotating antenna, comprising:

means for establishing in a storage device a list of one or more targets for a nonrotating antenna;

means for receiving digital data which contains information designating an intended recipient of that digital data;

means for determining whether the intended recipient of the digital data is in the list of targets; and means for, if the intended recipient of the digital data is in the list of targets, then providing the digital data to a nonrotating antenna for transmission, otherwise providing the digital data to a rotating antenna for transmission.

21. In a ground-based radar system including a one rotating antenna and a nonrotating antenna, a method for coordinating operation of the nonrotating antenna with operation of the rotating antenna to prevent the rotating antenna from interfering with the nonrotating antenna, wherein the rotating antenna has at least one beam of known width, said method comprising the steps of:

first determining the position of an intended recipient of digital data from the nonrotating antenna;

second determining whether the position of the intended recipient, as determined by said first determining step, is then within a beam of the rotating antenna; and if not, then transmitting the digital data via the nonrotating antenna, otherwise storing the digital data in a queue for reconsideration at a later time.

22. In a ground-based radar system including a rotating antenna and a nonrotating antenna, apparatus for coordinating operation of the nonrotating antenna with operation of the rotating antenna to prevent the rotating antenna from interfering with the nonrotating antenna, wherein the rotating antenna has at least one beam of known width, said apparatus comprising:

first determining means for determining the position of an intended recipient of digital data from the nonrotating antenna;

second determining means for determining whether the position of the intended recipient, as determined by said first determining means, is then within a beam of the rotating antenna; and means for if not, then transmitting the digital data via the nonrotating antenna, otherwise storing the digital data in a queue for reconsideration at a later time.

23. In a ground-based radar system including a rotating antenna and a nonrotating antenna, a method for transmitting a message via the rotating antenna or the nonrotating antenna, wherein the rotating antenna has at least one beam of known width, said method comprising the steps of:

establishing in a storage device a list of one or more targets for a nonrotating antenna;

receiving digital data which contains information designating an intended recipient of that digital data;

first determining whether the intended recipient of the digital data is in the list of targets; and if the intended recipient of the digital data is not in the list of targets, then providing the digital data to a rotating antenna for transmission;

if the intended recipient is in the list of targets, then second determining the position of the intended recipient of digital data from the nonrotating antenna;

third determining whether the position of the intended recipient, as determined by said second determining step, is then within a beam of the rotating antenna; and if not, then transmitting the digital data via the nonrotating antenna, otherwise storing the digital data in a queue for reconsideration at a later time.

24. In a ground-based radar system including a rotating antenna and a nonrotating antenna, apparatus for transmitting digital data via the rotating antenna or the nonrotating antenna, wherein the rotating antenna has at least one beam of known width, said apparatus comprising:

means for establishing in a storage device a list of one or more targets for a nonrotating antenna;

means for receiving digital data which contains information designating an intended recipient of that digital data;

first determining means for determining whether the intended recipient of the digital data is in the list of targets;

means for, if the intended recipient of the digital data is not in the list of targets, then providing the digital data to a rotating antenna for transmission;

second determining means for, if the intended recipient of is in the list of targets, then determining the position of the intended recipient of digital data from the nonrotating antenna;

third determining means for determining whether the position of the intended recipient, as determined by said second determining means, is then within a beam of the rotating antenna; and if not, then transmitting the digital data via the nonrotating antenna, otherwise storing the digital data in a queue for reconsideration at a later time.

* * * * *